United States Patent

Hoshina et al.

(10) Patent No.: US 10,050,266 B2
(45) Date of Patent: Aug. 14, 2018

(54) ACTIVE MATERIAL, NONAQUEOUS ELECTROLYTE BATTERY, BATTERY PACK AND VEHICLE

(71) Applicant: KABUSHIKI KAISHA TOSHIBA, Minato-ku (JP)

(72) Inventors: Keigo Hoshina, Kashiwazaki (JP); Wen Zhang, Sagamihara (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

(21) Appl. No.: 15/455,700

(22) Filed: Mar. 10, 2017

(65) Prior Publication Data

US 2017/0271668 A1  Sep. 21, 2017

(30) Foreign Application Priority Data

Mar. 16, 2016 (JP) ................. 2016-052847

(51) Int. Cl.
  *H01M 4/00* (2006.01)
  *H01M 4/485* (2010.01)
  (Continued)

(52) U.S. Cl.
  CPC ............. *H01M 4/485* (2013.01); *B60L 11/18* (2013.01); *C01G 23/003* (2013.01);
  (Continued)

(58) Field of Classification Search
  CPC ............... B60L 11/1879; H01M 4/485; H01M 10/0525; H01M 10/425; H01M 2220/20; C01G 23/003
  See application file for complete search history.

(56) References Cited

U.S. PATENT DOCUMENTS 7,682,746 B2  3/2010 Koshina
2009/0042095 A1  2/2009 Inagaki et al.
(Continued)

FOREIGN PATENT DOCUMENTS

EP  3 051 612 A1  8/2016
JP  2006-286599  10/2006
(Continued)

OTHER PUBLICATIONS

Extended European Search Report dated Apr. 21, 2017 in Patent Application No. 17157841.2.
(Continued)

*Primary Examiner* — Cynthia Harris Kelly
*Assistant Examiner* — Monique M Wills
(74) *Attorney, Agent, or Firm* — Oblon, McClelland, Maier & Neustadt, L.L.P.

(57) ABSTRACT

According to one embodiment, there is provided an active material. The active material includes particles of a Na-containing niobium titanium composite oxide having an orthorhombic crystal structure. An intensity ratio $I_1/I_2$ is within a range of $0.12 \leq I_1/I_2 \leq 0.25$ in an X-ray diffraction pattern of the active material, according to X-ray diffraction measurement using a Cu-K$\alpha$ ray. $I_1$ is a peak intensity of a peak $P_1$ that is present within a range where $2\theta$ is 27° to 28° in the X-ray diffraction pattern of the active material. $I_2$ is a peak intensity of a peak $P_2$ that is present within a range where $2\theta$ is 23° to 24° in the X-ray diffraction pattern of the active material.

12 Claims, 5 Drawing Sheets

(51) Int. Cl.
*H01M 10/42* (2006.01)
*C01G 23/00* (2006.01)
*B60L 11/18* (2006.01)
*H01M 4/505* (2010.01)
*H01M 4/525* (2010.01)
*H01M 10/0525* (2010.01)
*H01M 4/02* (2006.01)

(52) U.S. Cl.
CPC ........... *H01M 4/505* (2013.01); *H01M 4/525* (2013.01); *H01M 10/425* (2013.01); *B60L 11/1879* (2013.01); *H01M 10/0525* (2013.01); *H01M 2004/027* (2013.01); *H01M 2220/20* (2013.01)

(56) References Cited

U.S. PATENT DOCUMENTS

2012/0144442 A1* 6/2012 Chiang .............. H04N 21/4384
725/109
2012/0261622 A1 10/2012 Honma
2013/0224578 A1* 8/2013 Sawa ................ H01M 10/0525
429/200
2015/0086872 A1 3/2015 Ise et al.
2016/0141615 A1 5/2016 Nakayama et al.
2016/0226067 A1 8/2016 Harada et al.

FOREIGN PATENT DOCUMENTS

| | | |
|---|---|---|
| JP | 4521431 | 8/2010 |
| JP | 2015-84321 | 4/2015 |
| WO | WO 2015/019922 A1 | 2/2015 |

OTHER PUBLICATIONS

J. F. Colin, et al., "A Novel Layered Titanoniobate $LiTiNbO_5$: Topotactic Synthesis and Electrochemistry versus Lithium" Inorganic Chemistry, vol. 45, No. 18, 2006, XP055363464, pp. 7217-7223.

* cited by examiner

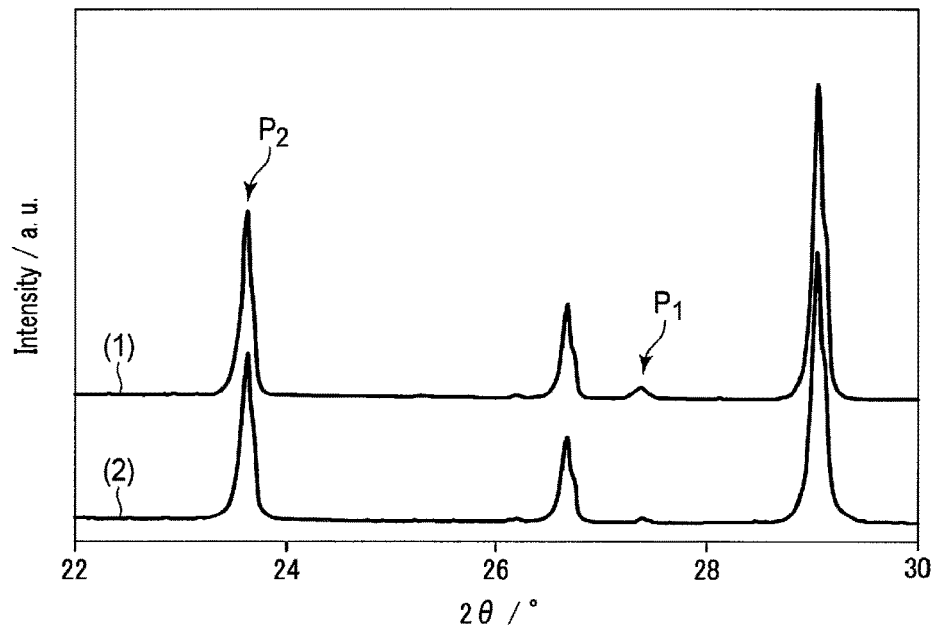
F I G. 1
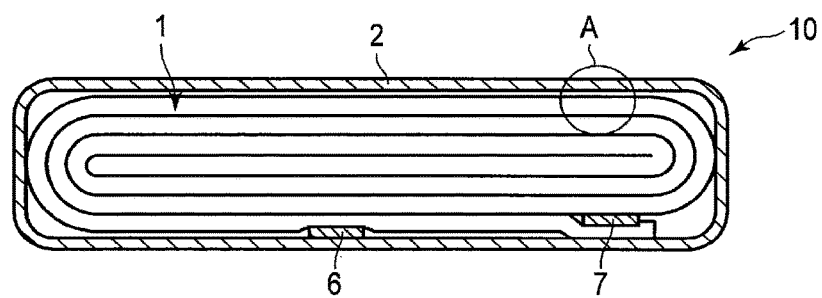
F I G. 2

US 10,050,266 B2

ACTIVE MATERIAL, NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Application No. 2016-052847, filed Mar. 16, 2016, the entire contents of which are incorporated herein by reference.

FIELD

Embodiments described herein relate generally to an active material, a nonaqueous electrolyte battery, a battery pack, and a vehicle.

BACKGROUND

A nonaqueous electrolyte battery, in which a charge and a discharge are performed by migration of lithium ions between a negative electrode and a positive electrode, has been actively researched as a high energy density battery.

In addition to the use as a power supply for small electronic devices, the nonaqueous electrolyte battery is expected to be utilized also as a medium to large power source, such as for in-vehicle applications and stationary applications. The nonaqueous electrolyte battery is required to have cycle life characteristics and high stability in such medium to large size applications. The nonaqueous electrolyte battery is further required to have high input-and-output characteristics.

Examples of nonaqueous electrolyte batteries having excellent cycle life characteristics and high stability include a nonaqueous electrolyte battery in which a lithium titanate having a spinel structure is used in a negative electrode. However, since the lithium titanate having the spinel structure has a high lithium insertion-and-extraction potential of approximately 1.55 V (vs. Li/Li$^+$), a battery voltage of a nonaqueous electrolyte battery using the lithium titanate having the spinel structure in a negative electrode is low. Further, since the lithium titanate having the spinel structure exhibits flat charge and discharge curves in the lithium insertion-and-extraction potential ranges, the lithium titanate having the spinel structure has such a feature that a change in potential accompanying a change in state-of-charge is very small.

BRIEF DESCRIPTION OF THE DRAWINGS

FIG. 1 shows X-ray diffraction patterns of an active material of one example according to the first embodiment and an active material of a reference example.

FIG. 2 is a schematic cross-sectional view of an example of a nonaqueous electrolyte battery according to a second embodiment;

DETAILED DESCRIPTION

Figure 3:
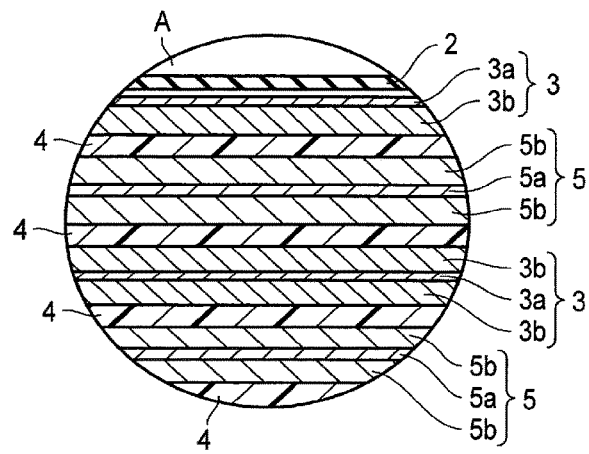
FIG. 3 is an enlarged cross-sectional view of an A portion in FIG. 2.

In general, according to one embodiment, there is provided an active material. The active material includes particles of a Na-containing niobium titanium composite oxide having an orthorhombic crystal structure. An intensity ratio $I_1/I_2$ is within a range of $0.12 \leq I_1/I_2 \leq 0.25$ in an X-ray diffraction pattern of the active material, according to X-ray diffraction measurement using a Cu-Kα ray. $I_1$ is a peak intensity of a peak $P_1$ that is present within a range where 2θ is 27° to 28° in the X-ray diffraction pattern of the active material. $I_2$ is a peak intensity of a peak $P_2$ that is present within a range where 2θ is 23° to 24° in the X-ray diffraction pattern of the active material.

According to the embodiment, there is provided a nonaqueous electrolyte battery. The nonaqueous electrolyte battery includes a positive electrode, a negative electrode, and nonaqueous electrolyte. The negative electrode includes the active material according to the embodiment.

According to the embodiment, there is provided a battery pack. The battery pack includes the nonaqueous electrolyte battery according to the embodiment.

According to the embodiment, there is provided a vehicle. The vehicle includes the battery pack according to the embodiment.

According to the embodiment, there is provided an active material. An active material includes particles of a Na-containing niobium titanium composite oxide having an orthorhombic crystal structure. The active material has an average crystalline size of 100 nm or more.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

First Embodiment

According to a first embodiment, there is provided an active material. The active material includes particles of a Na-containing niobium titanium composite oxide having an orthorhombic crystal structure. In an X-ray diffraction pattern of the active material, an intensity ratio $I_1/I_2$ is within a range of $0.12 \leq I_1/I_2 \leq 0.25$. $I_1$ is a peak intensity of a peak $P_1$ that is present within a range where 2θ is 27° to 28° in the X-ray diffraction pattern of the active material. $I_2$ is a peak intensity of a peak $P_2$ that is present within a range where 2θ is 23° to 24° in the X-ray diffraction pattern of the active material. The X-ray diffraction pattern is obtained by X-ray diffraction measurement using a Cu-Kα ray.

The active material according to the first embodiment can be used as an active material for a battery, for example.

A Na-containing niobium titanium composite oxide having an orthorhombic crystal structure which is included in the active material according to the first embodiment can be exhibit an average operating potential of 1.2 to 1.4 V (vs.

Li/Li$^+$). Among titanium composite oxides, this operating potential is a low value. Thus, the active material according to the first embodiment, including the orthorhombic Na-containing niobium titanium composite oxide, can achieve a nonaqueous electrolyte battery which can exhibit a high battery voltage.

The orthorhombic Na-containing niobium titanium composite oxide included in the active material according to the first embodiment can exhibit charge and discharge curves in which a change in potential accompanying a change in state-of-charge is large in the operating potential range. Thus, in the orthorhombic Na-containing niobium titanium composite oxide, the state-of-charge can be easily grasped based on a potential.

As compared with an orthorhombic Na-containing titanium composite oxide $Li_2Na_2Ti_6O_{14}$ exhibiting a reversible capacity of only approximately 90 mAh/g during charge and discharge within a potential range of 1.0 to 3.0 V (vs. Li/Li$^+$), the Na-containing niobium titanium composite oxide having the orthorhombic crystal structure can exhibit high reversible capacity during charge and discharge in a similar potential range. However, as a result of intensive studies, it has been found that it is difficult for the Na-containing niobium titanium composite oxide having the orthorhombic crystal structure to achieve higher capacity.

Based on the above, the present inventors have made intensive studies to achieve the active material according to the first embodiment.

The active material according to the first embodiment includes particles including a Na-containing niobium titanium composite oxide having an orthorhombic crystal structure, and in the X-ray diffraction pattern of the active material, an intensity ratio $I_1/I_2$ of peak intensity $I_1$ of a peak $P_1$ and peak intensity $I_2$ of a peak $P_2$ is within a range of $0.12 \leq I_1/I_2 \leq 0.25$, thereby, the active material can achieve a high capacity, although the detailed reason therefor is not clear.

In the X-ray diffraction pattern of the active material according to the first embodiment, since the intensity ratio $I_1/I_2$ is not 0, the X-ray diffraction pattern has the peak $P_1$.

It is assumed that the peak $P_1$ being present within a range where 2θ is 27° to 28° is not attributed to a phase of a pure orthorhombic Na-containing niobium titanium composite oxide. Accordingly, it is considered that the peak $P_1$ being present within the range where 2θ is 27° to 28° is a certain crystal phase formed near a surface of particles including a Na-containing niobium titanium composite oxide having an orthorhombic crystal structure.

On the other hand, in the X-ray pattern of the active material according to the first embodiment, the peak $P_2$ being present within a range where 2θ is 23° to 24° is considered to be a peak derived from a (311) plane of an orthorhombic Na-containing niobium titanium composite oxide.

In a case where the intensity ratio $I_1/I_2$ is less than 0.12, the capacity that can be achieved by the active material is lowered, although the detailed reason is not clear.

On the other hand, also in a case where the intensity ratio $I_1/I_2$ is more than 0.25, the capacity that can be achieved by the active material is lowered. It is considered that this is due to excessive formation of a phase attributed to the peak $P_1$.

The intensity ratio $I_1/I_2$ is preferably within a range of $0.14 \leq I_1/I_2 \leq 0.2$ and more preferably within a range of $0.16 \leq I_1/I_2 \leq 0.18$.

The peak $P_1$ is preferably present within a range where 2θ is 27.1° to 27.9° and more preferably present within a range where 2θ is 27.2° to 27.6°. The peak $P_2$ is preferably present within a range where 2θ is 23.1° to 23.8° and more preferably present within a range where 2θ is 23.3° to 23.7°.

An X-ray diffraction pattern of an active material as one example according to the first embodiment is shown by assigning a symbol (1) in FIG. 1. An X-ray diffraction pattern of an active material of the reference example is also shown by assigning a symbol (2) in FIG. 1.

Both the active material exhibiting the diffraction pattern (1) and the active material exhibiting the diffraction pattern (2) includes particles of an orthorhombic composite oxide having a composition of $Li_2Na_{1.9}Ti_{5.9}Nb_{0.1}O_{14}$. However, while the intensity ratio $I_1/I_2$ in the diffraction pattern (1) is 0.15, the intensity ratio $I_1/I_2$ in the diffraction pattern (2) is 0.1. The active material exhibiting the X-ray diffraction pattern (1) can achieve an excellent capacity as compared with the active material exhibiting the X-ray diffraction pattern (2).

Next, the active material according to the first embodiment will be described in more detail.

The active material according to the first embodiment includes particles of a Na-containing niobium titanium composite oxide having an orthorhombic crystal structure.

The Na-containing niobium titanium composite oxide having the orthorhombic crystal structure can be represented by a general formula of $Li_{2+v}Na_{2-w}M1_xTi_{6-y-z}Nb_yM2_zO_{14+\delta}$, for example.

In the general formula of $Li_{2+v}Na_{2-w}M1_xTi_{6-y-z}Nb_yM2_zO_{14+\delta}$, the subscript v can take values within a range of $0 \leq v \leq 4$, depending on a state-of-charge of the composite oxide.

In the general formula, the subscript w corresponds to the amount of Na included in the orthorhombic Na-containing niobium titanium composite oxide. The lithium insertion-and-extraction potential of the orthorhombic Na-containing niobium titanium composite oxide can be adjusted by, for example, the amount of Na in the composite oxide. The subscript w can have a value within a range of, for example, $0 < w < 2$. The subscript w preferably has a value within a range from 0.1 to 1.

In the general formula, the subscript x corresponds to the amount of the metallic element M1 included in the orthorhombic Na-containing niobium titanium composite oxide. The metallic element M1 may be at least one metallic element selected from the group consisting of Cs, K, Sr, Ba, and Ca. The metallic element M1 can be one metallic element. Alternatively, the metallic element M1 can include two or more metallic elements. The subscript x can has a value within a range of, for example, $0 \leq x < 2$. Thus, the orthorhombic Na-containing niobium titanium composite oxide may not include the metallic element M1. The subscript x preferably has a value within a range from 0.05 to 0.2.

In an aspect, the metallic element M1 includes Cs. When Cs is included, a more excellent cycle performance can be achieved. In another aspect, the metallic element M1 includes K. When K is included, a more excellent cycle performance can be achieved. In another aspect, the metallic element M1 includes Sr. When Sr is included, a more excellent rate performance can be achieved. In another aspect, the metallic element M1 includes Ba. When Ba is included, a more excellent rate performance can be achieved. In another aspect, the metallic element M1 includes Ca. When Ca is included, a more excellent rate performance can be achieved. The metallic element M1 preferably includes at least one of Sr and Ba.

In the general formula, the subscript y corresponds to the amount of niobium included in the orthorhombic Na-containing niobium titanium composite oxide. The subscript y can have a value within a range of, for example, 0<y<6. The subscript y preferably has a value within the range from 0.1 to 1.

In the general formula, the subscript z corresponds to the amount of the metallic element M2 included in the orthorhombic Na-containing niobium titanium composite oxide. The metallic element M2 may be at least one metallic element selected from the group consisting of Sn, V, Ta, Mo, W, Fe, Co, and Mn. The metallic element M2 can be one metallic element. Alternatively, the metallic element M2 can include two or more metallic elements. The subscript z can have a value within the range of, for example, $0 \leq z < 3$. Thus, the orthorhombic Na-containing niobium titanium composite oxide may not include the metallic element M2. The subscript z preferably has a value within a range from 0.1 to 0.3.

In an aspect, the metallic element M2 includes Sn. When Sn is included, a more excellent rate performance can be achieved. In another aspect, the metallic element M2 includes V. V can exhibit the same physical and chemical properties as those of Nb. In another aspect, the metallic element M2 includes Ta. Ta can exhibit the same physical and chemical properties as those of Nb. In another aspect, the metallic element M2 includes Mo. When Mo is included, a more excellent rate performance can be achieved. In another aspect, the metallic element M2 includes W. When W is included, a more excellent rate performance can be achieved. In another aspect, the metallic element M2 includes Fe. When Fe is included, a more excellent cycle performance can be achieved. In another aspect, the metallic element M2 includes Co. When Co is included, a more excellent cycle performance can be achieved. In another aspect, the metallic element M2 includes Mn. When Mn is included, a more excellent cycle performance can be achieved. The metallic element M2 preferably includes at least one selected from the group consisting of Sn and V.

The subscript δ may correspond to a deviation of the amount of oxygen from the orthorhombic Na-containing niobium titanium composite oxide that can be represented by the general formula of $Li_{2+v}Na_{2-w}M1_xTi_{6-y-z}Nb_yM2_zO_{14}$. A negative value of the subscript δ may mean that oxygen is less than the stoichiometric ratio. On the other hand, a positive value of the subscript δ may mean that oxygen is more than the stoichiometric ratio. It is difficult for composite oxide for which the value of the subscript δ exceeds the range of $-0.5 \leq \delta \leq 0.5$ to establish a balance between the rate and cycle characteristics. The subscript δ preferably has a value within a range of $-0.1 \leq \delta \leq 0.1$.

The active material according to the first embodiment may contain an orthorhombic Na-containing niobium titanium composite oxide other than composite oxides that can be represented by the general formula of $Li_{2+v}Na_{2-w}M1_xTi_{6-y-z}Nb_yM2_zO_{14}$. Examples of such composite oxides include an orthorhombic Na-containing niobium titanium composite oxide in which a Li content per 1 mol is less than 2 mols, such as $Li_{1.9}Na_{1.6}Ti_{5.5}Nb_{0.5}O_{14}$.

The active material according to the first embodiment may include one kind of orthorhombic Na-containing niobium titanium composite oxide, or two or more kinds of orthorhombic Na-containing niobium titanium composite oxide.

At least one kind of element selected from the group consisting of Mg, Al, Zr and Bi may be present on a surface of the particles of the Na-containing niobium titanium composite oxide having the orthorhombic crystal structure. Those elements may be present on the surface of the particles, in the form of, for example, oxide. As the oxide, oxides of Mg, Al, Zr or Bi, or composite oxides of Mg, Al, Zr or Bi and an element in the orthorhombic Na-containing niobium titanium composite oxide may be present on the particle surface. If those elements are present, a side reaction on the surface of the particles of the orthorhombic Na-containing niobium titanium composite oxide is suppressed, so that resistance is less likely to increase.

The particles included in the active material according to the first embodiment may be in the form of primary particles or in the form of secondary particles as agglomerates of primary particles. An average primary particle size is preferably 0.5 µm or more and 3 µm or less. When the active material according to the first embodiment includes secondary particles, an average secondary particle size is preferably 4 µm or more and 20 µm or less. Whether the particles are present as primary particles or secondary particles as agglomerates of primary particles can be confirmed by scanning electron microscope (SEM) observation. The average particle size of the primary particles or the secondary particles can be measured by laser diffraction particle size distribution measurement. A median diameter in the laser diffraction particle size distribution measurement is taken to be the average particle diameter.

The particles included in the active material according to the first embodiment preferably have a specific surface area of 1 $m^2/g$ or more and 20 $m^2/g$ or less.

[Production Method]

The active material according to the first embodiment can be produced by, for example, a solid-state method to be hereinafter described by referring to examples. However, the active material according to the first embodiment can also be produced by a wet method, such as a hydrothermal method, a sol-gel method, and a coprecipitation method, in place of the solid-phase method. In wet synthesis, fine particles are easily obtained.

Hereinafter, an example of a method of synthesizing the active material according to the first embodiment with the use of the solid-state method will be described.

First, among a Ti source, a Li source, a Na source, a Nb source, a metal element M1 source, and a metal element M2 source, the necessary raw material is provided in accordance with the target composition of the orthorhombic Na-containing niobium titanium composite oxide to be included in the active material. These raw materials may be compound such as an oxides or salts, for example. The above salt is preferably a salt decomposed at relatively low temperature to produce an oxide, such as carbonate or nitrate.

Next, the provided raw materials are mixed at an appropriate stoichiometric ratio, thus obtaining a mixture. For example, when a Na-containing niobium titanium composite oxide having an orthorhombic crystal structure and represented by a composition formula of $Li_2Na_{1.7}Ti_{5.7}Nb_{0.3}O_{14}$ is to be synthesized, $TiO_2$, $Li_2CO_3$, $Na_2CO_3$, and $Nb(OH)_5$ are mixed such that a molar ratio Li:Na:Ti:Nb in the mixture is 2:1.7:5.7:0.3 in terms of molar ratio.

In the mixing, it is preferable that the raw material is satisfactorily ground and mixed. When the raw material is ground and mixed, the raw materials easily react with each other in the subsequent heat treatment, and generation of impurities can be reduced at the synthesis of a composite oxide. Li and Na may be mixed in an amount larger than a predetermined amount. In particular, since Li may be lost during heat treatment, Li may be added in an amount larger than the predetermined amount.

Next, the mixture of the raw materials is subjected to a first heat treatment at a temperature of from 800° C. to 1000°

C. for from 1 hour to 24 hours in the air atmosphere. Satisfactory crystallization is less likely to be obtained at a temperature lower than 800° C. On the other hand, when the temperature exceeds 1000° C., grain growth is excessively advanced, so that coarse particles are formed, and thus it is not preferable. Similarly, if the first heat treatment time is less than 1 hour, satisfactory crystallization is less likely to be obtained. If the first heat treatment time is more than 24 hours, grain growth is excessively advanced, so that coarse particles are formed, and thus it is not preferable. It is preferable that the mixture is heat treated at a temperature of from 850° C. to 950° C. for from 2 hours to 5 hours. When an orthorhombic Na-containing niobium titanium composite oxide represented by a composition formula of $Li_2Na_{1.7}Ti_{5.7}Nb_{0.3}O_{14}$ is synthesized, the first heat treatment is performed at 900° C. for 3 hours, for example.

Next, a product obtained by the first heat treatment is subjected to a second heat treatment in an oxygen atmosphere. A heat treatment temperature of the second heat treatment is preferably from 500° C. to 900° C. If the temperature is less than 500° C., the capacity is less likely to be enhanced, and if the temperature is more than 900° C., there is concern that grain growth is excessively advanced. A heat treatment time is preferably 1 to 3 hours. It is preferable to select the heat treatment temperature and the heat treatment time of the second heat treatment in combination. For example, when the second heat treatment is performed at high temperature for a long time, a crystal phase attributed to the peak $P_1$ is excessively produced, and the capacity may be lowered.

Alternatively, the mixture, which is obtained by mixing the product obtained by the first heat treatment in purified water with a compound containing at least one metal element selected from the group consisting of Mg, Al, Zr, and Bi, may be subjected to the second heat treatment. As the compound including at least one metal element selected from the group consisting of Mg, Al, Zr, and Bi, nitrate or acetate may be used, for example. A polymer such as polyvinyl alcohol or polyvinylpyrrolidone may be added to the mixture to be subjected to the second heat treatment. By virtue of adding the polymer, the product obtained by the first heat treatment and the compound including at least one metal element selected from the group consisting of Mg, Al, Zr, and Bi are likely to be more uniformly mixed.

The active material according to the first embodiment can be obtained by performing the above described second heat treatment.

[Identification Method of Crystal Structure and Composition of Particles Included in Active Material]

The crystal structure and the composition of particles included in the active material to be measured can be identified by, for example, using a scanning electron microscope (SEM), an X-ray diffraction (XRD) measurement, an energy dispersive X-ray spectroscopy (EDX), and an inductively coupled plasma (ICP) emission spectroscopy in combination. In the powder X-ray diffraction measurement of an active material, the crystal structure (crystal system) can be identified as follows. First, the value of a scattering angle $2\theta$ is determined from the position of diffraction peak obtained by the XRD measurement. And then, a crystal spacing d is calculated according to the Bragg's law. The analysis allows the crystal structure (crystal system) to be identified. Should be noted that known substances can be identified by referring to diffraction data of standard substances such as cards of the Joint Committee on Powder Diffraction Standards (JCPDS).

<Powder X-Ray Diffraction Measurement of Active Material>

The powder X-ray diffraction measurement of an active material is made as described below. First, the sample is ground in a mortar. A holder portion having a depth 0.2 mm or more formed on a glass sample-plate is filled with the obtained sample. The filled sample is smoothed by using a glass plate. At that time, care must be taken so as to prevent cracks, voids and the like due to insufficient filling with the sample. To correctly determine the peak position, the filling is performed in such a way that unevenness from the reference surface of the holder is not generated.

Next, the glass plate filled with the sample is placed in a powder X-ray diffraction device and a diffraction pattern is obtained by using Cu-Kα rays.

The influence of particle orientation may arise due to the particle shape of the sample, leading to a deviation of the peak position or changes of the intensity ratio. In such a case, the influence can be checked by filling a capillary made of Lindemann glass with the same sample and making measurements using a rotary sample stand.

The measurement can be performed by using Cu-Kα rays as a radiation source and varying $2\theta$ within a measurement range of $5° \leq 2\theta \leq 90°$ to obtain the X-ray diffraction pattern.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5° \leq 2\theta \leq 90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

When the orthorhombic Na-containing niobium titanium composite oxide is included in the active material to be measured, an X-ray diffraction pattern assigned to the orthorhombic system such as the space group of Cmca or Fmmm can be obtained by the X-ray diffraction measurement.

The intensity ratio $I_1/I_2$ of the peak intensity $I_1$ of the peak P1 that is present within the range where $2\theta$ is 27° to 28° in the X-ray diffraction pattern and the peak intensity $I_2$ of the peak $P_2$ that is present within the range where $2\theta$ is 23° to 24° in the X-ray diffraction pattern are obtained from obtained data. When a plurality of peaks are present within the range where $2\theta$ is 27° to 28° in the X-ray diffraction pattern, the peak intensity of a strongest peak is taken to be the peak intensity $I_1$. Similarly, when a plurality of peaks are present within the range where $2\theta$ is 23° to 24° in the X-ray diffraction pattern, the peak intensity of a strongest peak is taken to be the peak intensity $I_2$.

Next, particles are observed according to the following procedure by using a scanning electron microscope (SEM) and energy dispersive X-ray spectroscopy (EDX) in combination.

First, a powder of an active material to be measured is observed through the scanning electron microscope (SEM). A sample is sampled in an inert atmosphere such as argon and nitrogen while avoiding contact with the air.

Some particles are selected randomly using an SEM observation image at a magnification of 3000. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles. As for Li, it is possible to obtain information on the content of Li in the whole active material by inductively coupled plasma (ICP) atomic emission spectrometry, to be described later.

If the observed particle contains Na, Ti, Nb, and O and further, an X-ray diffraction pattern assigned to the orthorhombic system is obtained from the active material to be measured by the above XRD measurement, it is found that particles of an orthorhombic Na-containing niobium titanium composite oxide are present in the active material to be measured.

<Identification of Amount of Element Included in Active Material>

The amount of element included in an active material can be identified by inductively coupled plasma (ICP) emission spectroscopy following the procedure below.

First, an active material to be measured is dissolved by acid to prepare a liquid sample. At that time, hydrochloric acid, nitric acid, sulfuric acid, hydrogen fluoride or the like can be used as acid. By subjecting the liquid sample to ICP emission spectrochemical analysis, the concentrations of elements included in the active material to be measured can be known.

<Powder X-Ray Diffraction Measurement of Active Material Included in Electrode>

Powder X-ray diffraction measurement of an active material included in an electrode is performed as follows.

First, a battery being in a discharged state is put in a glove box filled with argon gas. The discharged state here means a state in which the battery has been discharged at constant current to a discharge lower limit voltage by a current value of not more than 0.2 C under an environment of 25° C.

Next, in the glove box, a target electrode is taken out of the battery. The removed electrode is washed with an ethyl methyl ether solvent, dried, and then attached to a glass sample plate. At this time, it is noted that the electrode is prevented from being peeled or unsettled using a double sided tape or the like. If necessary, the electrode may be cut into an appropriate size for being attached to the glass sample plate. In order to caribrate a peak position, an Si standard sample may be attached to the electrode.

Subsequently, the glass plate to which the electrode is attached is installed in a powder X-ray diffraction apparatus, and a diffraction pattern is obtained using a Cu-Kα ray. The measurement apparatus and conditions are as described above.

[Measurement of Amount of Element Included in Active Material Included in Electrode]

The composition of the active material included in the electrode can be measured by the following procedure.

First, the electrode including an active material to be measured is taken out of the nonaqueous electrolyte battery and washed, according to the procedures described above.

Subsequently, a portion of the washed electrode is put into an appropriate solvent to apply an ultrasonic wave thereto. For example, by putting an electrode body into ethylmethyl carbonate in a glass beaker and vibrating the electrode body in an ultrasonic washer, an electrode layer including the electrode active material can be peeled off a current collector substrate. Next, the peeled electrode layer is dried under reduced pressure. By grinding the obtained electrode layer in a mortar or the like, a powder including the active material to be measured, a conductive agent, a binder and the like is obtained. By dissolving the powder by acid, a liquid sample including the active material can be prepared. At that time, hydrochloric acid, nitric acid, sulfuric acid, hydrogen fluoride or the like can be used as acid. By subjecting the liquid sample to ICP emission spectral analysis, the concentrations of elements included in the active material included in the electrode can be found.

[Method of Measuring Specific Surface Area]

In measuring a specific surface area, it is possible to use a method in which a molecule of which the adsorption occupying area is known is made to adsorb to a surface of a powder particle at the temperature of liquid nitrogen, and the specific surface area of the powder particle is calculated from the amount of the molecule adsorbed on it. A method that is most frequently used to obtain the specific surface area is the BET method using the low-temperature and low-humidity physical adsorption of an inert gas. This method is based on the best-known theory of the method of calculating the specific surface area in which the Langmuir theory as a monolayer adsorption theory is extended to multilayer adsorption. The specific surface area determined by the above method is referred to as "BET specific surface area".

According to the first embodiment, the active material is provided. The active material according to the first embodiment includes particles including a Na-containing niobium titanium composite oxide having an orthorhombic crystal structure. In the X-ray diffraction pattern of the active material, the intensity ratio $I_1/I_2$ of the peak intensity $I_1$ of the peak $P_1$ and the peak intensity $I_2$ of the peak $P_2$ is within the range of $0.12 \leq I_1/I_2 \leq 0.25$. Consequently, the active material according to the first embodiment can achieve a nonaqueous electrolyte battery which can exhibit high capacity.

Second Embodiment

According to a second embodiment, there is provided a nonaqueous electrolyte battery. The nonaqueous electrolyte battery includes a negative electrode, a positive electrode, and a nonaqueous electrolyte. The negative electrode includes the active material according to the first embodiment.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode may include a current collector and a negative electrode layer (a negative electrode active material-containing layer). The negative electrode layer may be formed on one surface or both surfaces of the current collector. The negative electrode layer may include a negative electrode active material and also optionally a conductive agent and a binder.

The active material according to the first embodiment may be included in the negative electrode layer as the negative electrode active material.

The negative electrode active material may include a negative electrode active material other than the active material according to the first embodiment. Examples of such a negative electrode active material include a lithium titanate (for example, $Li_4Ti_5O_{12}$) having a spinel structure and a monoclinic niobium titanium composite oxide (for example, $TiNb_2O_7$). The active material according to the first embodiment is preferably included in 70% by mass, and more preferably 80% by mass, based on the total mass of the negative electrode active material.

The conductive agent can have the effect of improving current-collecting performance and reducing contact resistance between the negative electrode active material and the current collector. Examples of the conductive agent include carbonaceous substances such as acetylene black, carbon black, graphite, carbon nanofiber, and carbon nanotube. These carbonaceous substances may be used singly or plural carbonaceous substances may be used.

The binder can have the effect of binding the negative electrode active material, the conductive agent, and the negative electrode current collector. Examples of the binder include polytetrafluoro ethylene (PTFE), polyvinylidene difluoride (PVdF), fluororubber, styrene-butadiene rubber, acrylic resin and copolymers thereof, polyacrylic acid, and polyacrylonitrile.

As for the blending ratio of the negative electrode active material, the conductive agent, and the binder is preferably within the ranges of: 70% by mass or more and 96% by mass or less for the negative electrode active material; 2% by mass or more and 28% by mass or less for the conductive agent; and 2% by mass or more and 28% by mass or less for the binder. The amount of the conductive agent is set to 2% by mass or more, whereby the current-colleting performance of the negative electrode layer can be improved and then excellent large-current characteristics can be expected. Also, the amount of the binder is set to 2% by mass or more, whereby sufficient binding properties between the negative electrode layer and the current collector can be obtain and then excellent cycle characteristics can be expected. From the viewpoint of higher capacities, on the other hand, the conductive agent and the binder are each preferably set to 28% by mass or less.

The negative electrode current collector is preferably formed from aluminum foil or aluminum alloy foil including elements such as Mg, Ti, Zn, Mn, Fe, Cu, and Si.

The negative electrode is produced by, for example, the following method. First, a negative electrode active material, a conductive agent, and a binder are suspended in a solvent to prepare a slurry. The slurry thus prepared is applied to one surface or both surfaces of the negative electrode current collector and next, the coated film is dried. In this manner, a negative electrode layer can be formed. Then, the negative electrode layer is pressed.

Alternatively, a negative electrode active material, a conductive agent and a binder can be formed into pellets, and the pellets can be arranged on the negative electrode current collector to produce the negative electrode layer.

2) Positive Electrode

The positive electrode can include a current collector and a positive electrode layer (a positive electrode active material-containing layer). The positive electrode layer may be formed on one surface or both surfaces of the current collector. The positive electrode layer can include a positive electrode active material, and optionally a conductive agent and a binder.

The positive electrode active material may be, for example, an oxide or a composite oxide. Lithium can be inserted into the oxide and the composite oxide, and be extracted from them. Examples of the oxide and composite oxide include a manganese dioxide ($MnO_2$), an iron oxide, a copper oxide, a nickel oxide, a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), lithium nickel cobalt aluminum composite oxide (e.g., $LiNi_{1-y-z}Co_yAl_zO_2$), a lithium manganese nickel composite oxide having a spinel structure (e.g., $Li_xMn_{2-y}Ni_yO_4$) a lithium phosphorus oxide having an olivine structure (e.g., $Li_xFePO_4$, $Li_xMnPO_4$, $Li_xMn_{1-y}Fe_yPO_4$, and $Li_xCoPO_4$), an iron sulfate (e.g., $Fe_2(SO_4)_3$), and a vanadium oxide (e.g., $V_2O_5$). In the above-described formula, the ranges of $0<x\leq1$, $0<y\leq1$, and $0\leq z\leq1$ are preferably. As the active material, one of these compounds may be used singly, or combination of two or more of the compounds can be used.

Among these, a lithium manganese composite oxide (e.g., $Li_xMn_2O_4$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), and a lithium phosphorus oxide having an olivine structure (e.g., $Li_xFePO_4$, $Li_xMnPO_4$, $Li_xMn_{1-y}Fe_yPO_4$, and $Li_xCoPO_4$) are preferable. In the above-described formula, the ranges of $0<x\leq1$, $0\leq y\leq1$, and $0\leq z\leq1$ are preferably.

The conductive agent can have the effect of improving the current-collecting performance and reducing the contact resistance of the active material with the current collector. Examples of the conductive agent include carbonaceous substances such as acetylene black, carbon black, graphite, carbon nanofiber, and carbon nanotube. These carbonaceous substances may be used singly or plural carbonaceous substances may be used.

The binder can have the effect of binding the active material, the conductive agent, and the current collector. Examples of the binder include polytetrafluoroethylene (PTFE), polyvinylidene fluoride (PVdF), fluorine-based rubber, styrene butadiene rubber, acrylic resin, copolymers of acrylic resin, polyacrylic acid, and polyacrylonitrile.

As for the blending ratio of the positive electrode active material, the conductive agent and the binder in the positive electrode layer, it is preferable that the content of the positive electrode active material is from 80% by mass to 95% by mass, the content of the conductive agent is from 3% by mass to 18% by mass, and the content of the binder is from 2% by mass to 17% by mass. The amount of the conductive agent is set to 3% by mass or more, whereby the above-described effect can be obtained. The amount of the conductive agent is set to 18% by mass or less, whereby decomposition of a nonaqueous electrolyte at a surface of the conductive agent can be restrained during the storage at a high temperature. The amount of the binder is set to 2% by mass or more, whereby the sufficient strength of the electrode can be obtained. If the amount of the binder is set to 17% by mass, a content of the binder, which is an insulating material, in the positive electrode is decreased, and therefore, an internal resistance can be decreased.

The current collector is preferably an aluminum foil, or an aluminum alloy foil containing one or more elements selected from Mg, Ti, Zn, Mn, Fe, Cu, and Si.

The positive electrode is produced by, for example, the following procedures. At first, a positive electrode active material, a conductive agent, and a binder are suspended in a solvent to prepare a slurry. The slurry is applied to one surface or both surfaces of a positive electrode current collector, the coated film is dried. Thus, a positive electrode layer can be obtained. And then, the layer is subjected to a pressing. Alternatively, a positive electrode active material, a conductive agent, and a binder are formed into pellets, and then, the pellets can be arranged on the positive electrode current collector to produce a positive electrode layer.

3) Nonaqueous Electrolyte

The nonaqueous electrolyte may be, for example, a liquid nonaqueous electrolyte or gel-like nonaqueous electrolyte. The liquid nonaqueous electrolyte is prepared by dissolving an electrolyte in an organic solvent. The concentration of the electrolyte is preferably within a range of 0.5 mol/L to 2.5 mol/L. The gel-like nonaqueous electrolyte can be prepared by mixing a liquid nonaqueous electrolyte and a polymer material to obtain a composite.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide ($LiN(CF_3SO_2)_2$) One electrolyte of these electrolytes can be used alone, or two or more electrolytes of these electrolytes can be used in mixture. The electrolyte preferably includes $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); acetonitrile (AN), and sulfolane (SL). One of these organic solvents can be used alone or two or more solvent can be used as a mixed solvent.

More preferred examples of organic solvent include a mixed solvent which is prepared by mixing two or more solvent selected from the group consisting of propylene carbonate (PC), ethylene carbonate (EC), diethyl carbonate (DEC), dimethyl carbonate (DMC), and methyl ethyl carbonate (MEC). By using such a mixed solvent, a nonaqueous electrolyte battery which is excellent in charge-and-discharge-cycle characteristics can be obtained. Furthermore, an additive can be added to the nonaqueous electrolyte.

4) Separator

As the separator, for example, a porous film formed from materials such as polyethylene, polypropylene, polyethylene terephthalate, cellulose, and polyvinylidene fluoride (PVdF), nonwoven fabric made of synthetic resin or the like can be used. Further, a separator obtained by applying an inorganic compound to a porous film can also be used.

(5) Container Member

As the container member, for example, a bag-like container made of laminate film or a metallic container is used. As the shape thereof, the flat shape, square shape, cylindrical shape, coin shape, button shape, sheet shape, and stack shape can be cited. It is needless to say that in addition to a small battery mounted on mobile electronic devices, the nonaqueous electrolyte battery may also be a large battery mounted on two-wheeled to four-wheeled automobiles.

As the laminate film, for example, a multilayer film in which a metal layer is sandwiched between resin films can be used. The laminate film used as a container member is not limited to one in which a metal layer is sandwiched between resin films, a multilayer film consisting of a metal layer and resin layers covered the metal layer can be also used.

The metal layer is preferably aluminum foil or aluminum alloy foil to reduce the weight thereof. The resin film is used in order to reinforce the metal layer. As the resin film, for example, a polymeric material such as polypropylene (PP), polyethylene (PE), nylon, and polyethylene terephthalate (PET) can be used. The laminate film can be formed into the shape of a container member by performing heat sealing. The laminated film preferably has a thickness of 0.2 mm or less.

The container made of metal can be formed from, for example, aluminum or an aluminum alloy. The aluminum alloy preferably contains an element such as magnesium, zinc, or silicon. On the other hand, the content of transition metal such as iron, copper, nickel, and chromium is preferably reduced to 100 ppm or less. Whereby, long-term reliability and heat dissipation properties in a high-temperature environment can remarkably be improved.

The wall thickness of the container made of metal is preferably 0.5 mm or less and particularly preferably 0.2 mm or less.

(6) Negative Electrode Terminal

The negative electrode terminal is preferably formed from a material that is electrically stable at a potential in the range of 0.8 V to 3.0 V with respect to the oxidation-reduction potential of lithium, and has conductivity. More specifically, the negative electrode terminal is preferably formed from aluminum or an aluminum alloy including an element such as Mg, Ti, Zn, Mn, Fe, Cu, and Si. To reduce contact resistance with the negative electrode current collector, the negative electrode terminal is preferably formed from a material similar to that of the negative electrode current collector.

(7) Positive Electrode

The positive electrode terminal is preferably formed from a material that is electrically stable at a potential within the range of 3.0 V to 4.5 V with respect to the oxidation-reduction potential of lithium, and has conductivity. More specifically, the positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 2 and 3.

FIG. 2 is a schematic cross-sectional view of an example of a nonaqueous electrolyte battery according to a second embodiment. FIG. 3 is an enlarged cross-sectional view of an A portion in FIG. 2

A nonaqueous electrolyte battery 10 shown in FIGS. 2 and 3 includes a bag-shaped container member 2 shown in FIG. 2, an electrode group 1 shown in FIGS. 2 and 3, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 2, the electrode group 1 is a wound (coiled) electrode group in a flat form. The coiled electrode group 1 in a flat form is formed by, as shown in FIG. 3, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. The negative electrode layer includes the active material according to the first embodiment. A part of the negative electrode 3 located in the outermost layer has a configuration in which a negative electrode layer 3b is formed on one surface which is the internal surface of a negative electrode current collector 3a as shown in FIG. 3. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 2, in the vicinity of the outer peripheral edge of the wound electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 2 and 3 can be produced according to the following procedure, for example. First, an electrode group 1 is produced. The electrode group 1 is then enclosed in a bag-shaped container member 2. At that time, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the wound electrode group 1 and the liquid nonaqueous electrolyte are completely sealed.

Figure 4:
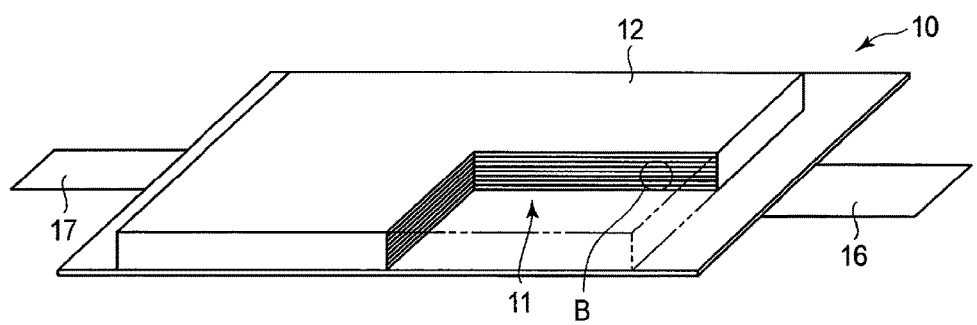
FIG. 4 is a partially cutaway perspective view schematically showing another example of a nonaqueous electrolyte battery according to the second embodiment.
Figure 5:
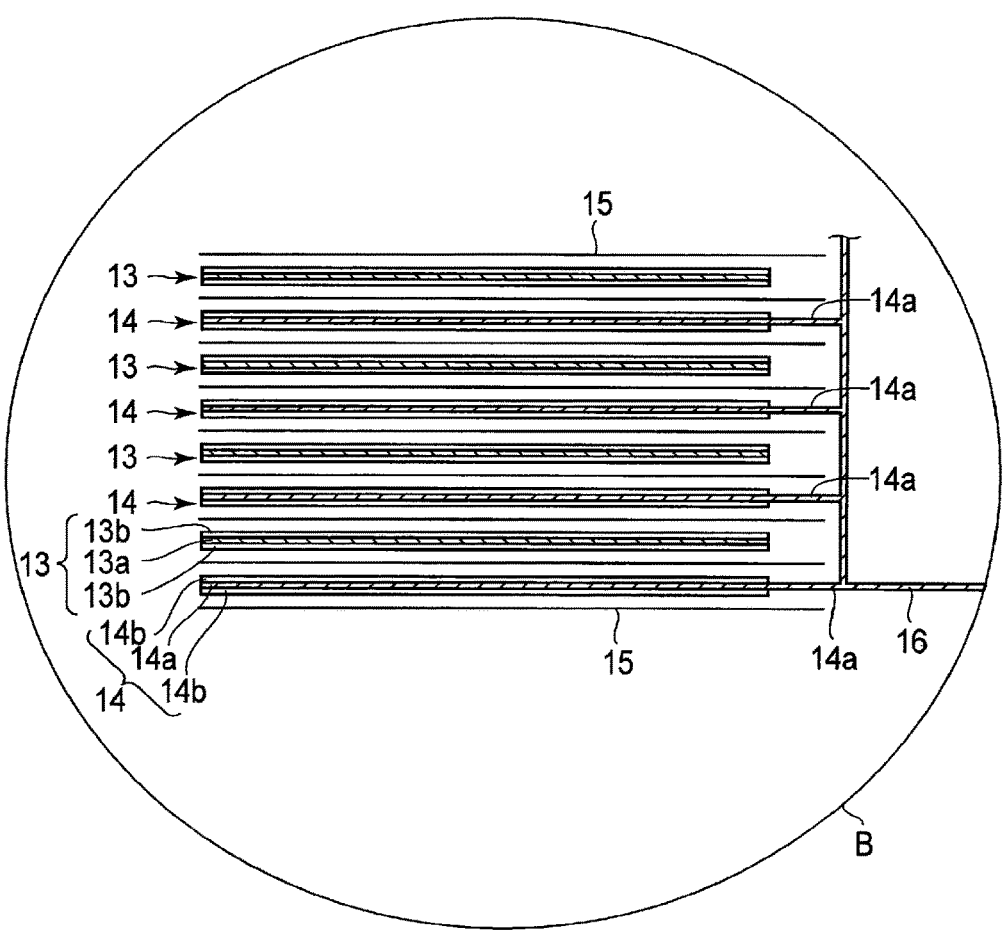
FIG. 5 is an enlarged cross-sectional view of a B portion in FIG. 4.

The nonaqueous electrolyte battery according to the second embodiment is not limited to the nonaqueous electrolyte battery as an example shown in FIGS. 2 and 3, and may be, for example, a battery having a structure shown in FIGS. 4 and 5.

FIG. 4 is a partially cutaway perspective view schematically showing another exemple of a nonaqueous electrolyte battery according to the second embodiment. FIG. 5 is an enlarged cross-sectional view of a B portion in FIG. 4.

A nonaqueous electrolyte battery 10 shown in FIGS. 4 and 5 includes an electrode group 11 shown in FIGS. 4 and 5, a container member 12 shown in FIG. 4, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 5, the electrode group 11 is a stacked electrode group. As shown in FIG. 5, the stacked electrode group 11 has a structure in which positive electrodes 13 and negative electrodes 14 are alternately laminated with a separator 15 sandwiched therebetween.

The electrode group 11 includes positive electrodes 13. Each of the positive electrodes 13 includes a positive electrode current collector 13a, and a positive electrode layer 13b supported on each of the both surfaces of the positive electrode current collector 13a. The electrode group 11 includes negative electrodes 14. Each of the negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the positive electrode 13. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the negative electrode 14 at the side opposed to the protruded side of the negative electrode current collector 14a. The protruded part of the positive electrode current collector 13a is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes a negative electrode including the active material according to the first embodiment. Thus, the nonaqueous electrolyte battery can exhibit a high capacity.

Third Embodiment

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The nonaqueous electrolyte batteries can be electrically connected in series, in parallel, or with a combination of series connection and parallel connection. The nonaqueous electrolyte batteries can be electrically connected to constitute a battery module. The battery pack according to the third embodiment may include battery modules.

The battery pack according to the third embodiment may further include a protective circuit. The protective circuit has a function to control charging and discharging of the nonaqueous electrolyte battery. Alternatively, a circuit included in an equipment (for example, electronic devices, vehicles, and the like) where the battery pack serves as a power source may be used as the protective circuit for the battery pack.

Moreover, the battery pack according to the third embodiment may further include an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the third embodiment will be described with reference to the drawings.

Figure 6:
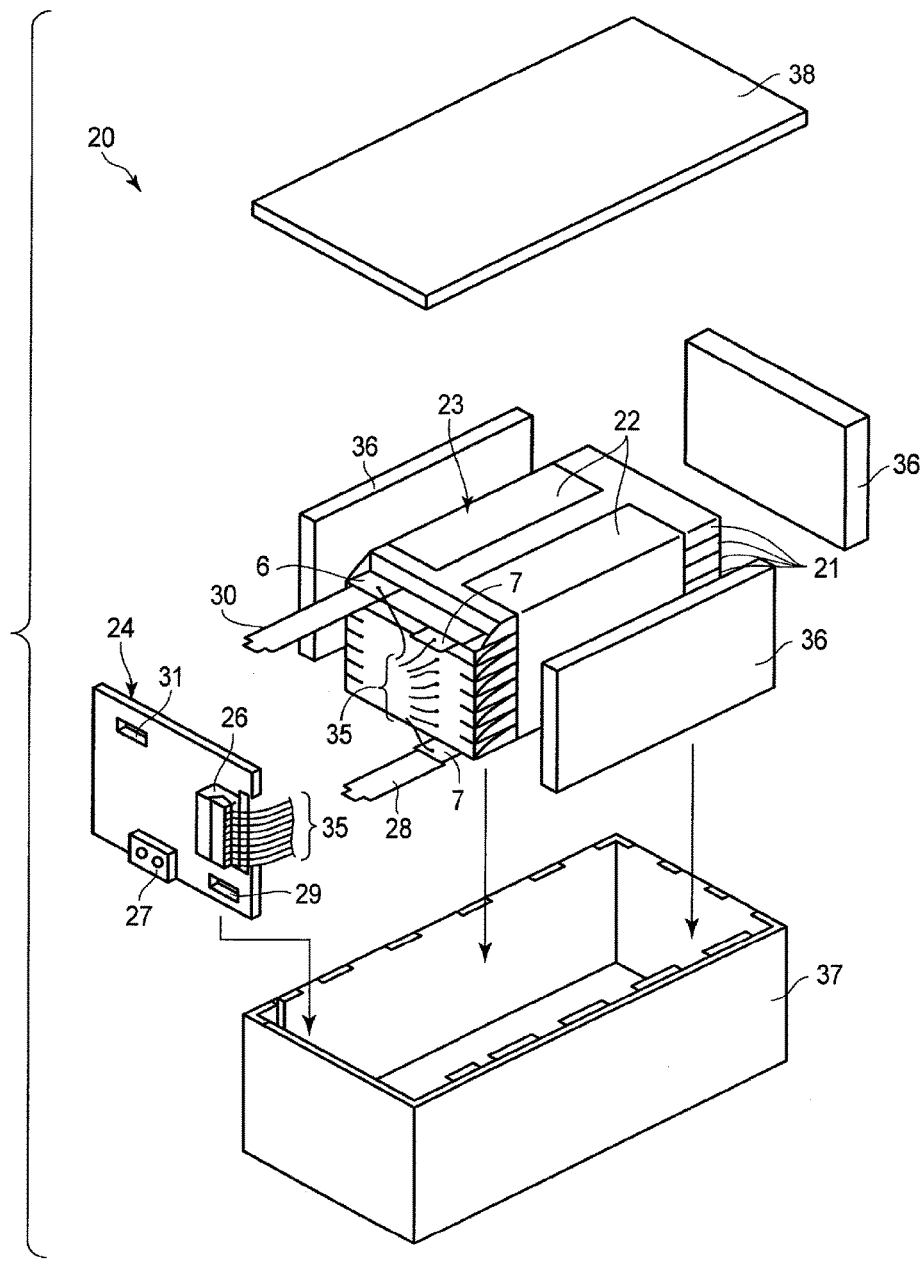
FIG. 6 is a schematic exploded perspective view of an example of a battery pack according to a third embodiment.
Figure 7:
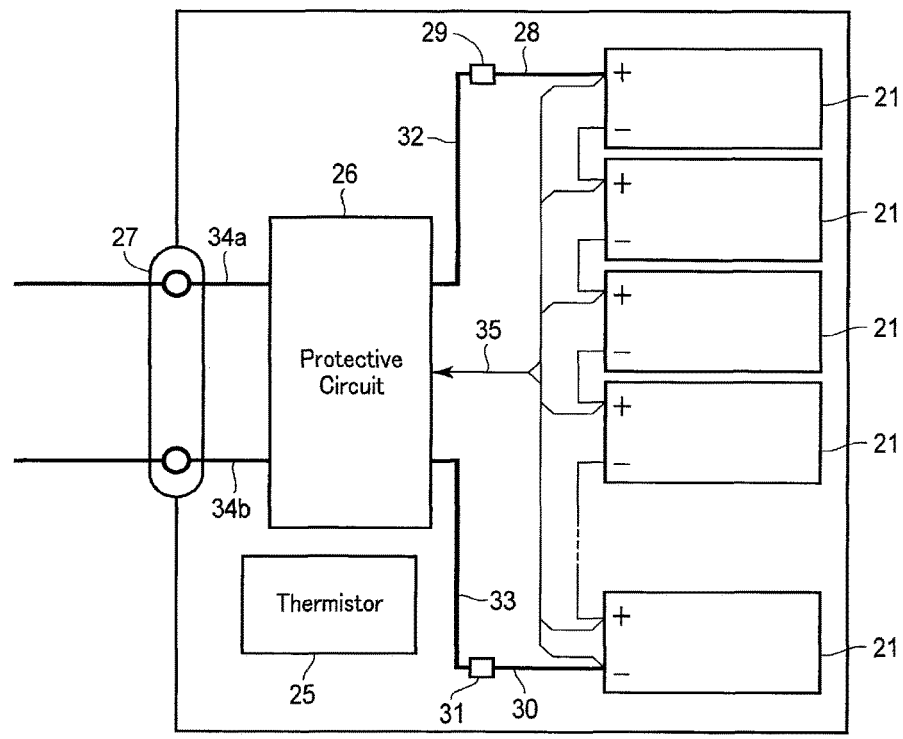
FIG. 7 is a block diagram showing an electric circuit of the battery pack in FIG. 6.

FIG. 6 is an exploded perspective view showing one example of a battery pack according to a third embodiment. FIG. 7 is a block diagram showing an electric circuit of the battery pack in FIG. 6.

A battery pack 20 shown in FIGS. 6 and 7 includes a plurality of unit cells 21. Each of the plurality of unit cells 21 is flat nonaqueous electrolyte battery 10 described with reference to FIGS. 2 and 3.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 7.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 7. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 6 and 7, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 6 and 7, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric trains).

Figure 8:
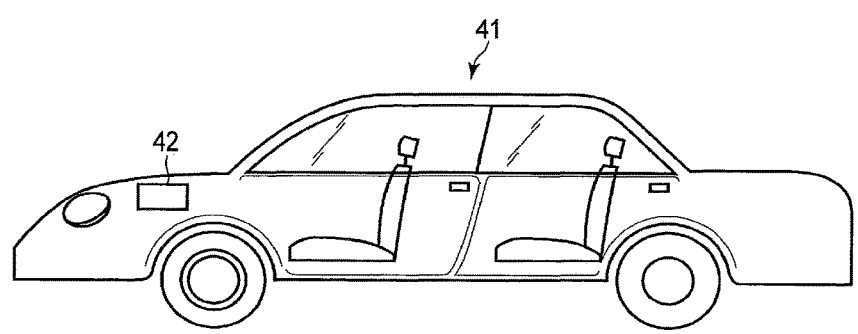
FIG. 8 is a schematic sectional view showing an example of an automobile which includes an example of a battery pack according to a third embodiment.

FIG. 8 shows an example of an automobile which includes an example of a battery pack according to the third embodiment.

The automobile 41 shown in FIG. 8 includes a battery pack 42 which is an example of the battery pack according to the third embodiment mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Therefore, the battery pack according to the third emebodiment can exhibit a high capacity.

Fourth Embodiment

According to the fourth embodiment, the active material is provided. The active material includes particles of a Na-containing niobium titanium composite oxide having an orthorhombic crystal structure. The active material has an average crystalline size of not less than 100 nm.

The active material according to the fourth embodiment can be used as an active material for a battery, for example.

Since the active material according to the fourth embodiment has high crystallinity, it is possible to provide a nonaqueous electrolyte battery which can exhibit excellent cycle life characteristics and excellent rate characteristics.

If the average crystalline size is less than 100 nm, the crystallinity is low, and the crystal structure is unstable. The crystal structure of the active material having such an average crystalline size is likely to change due to the repeated Li-insertion and extraction, and the cycle characteristics are poor. The average crystalline size is preferably from 110 nm to 500 nm and more preferably from 120 nm to 200 nm.

In the active material according to the fourth embodiment, it is preferable that an average primary particle size is within a range of from 0.5 µm to 2 µm. The active material of this preferable embodiment can achieve more excellent cycle life characteristics and more excellent rate characteristics. The average primary particle size is preferably from 0.7 µm to 1.8 µm and more preferably from 0.8 µm to 1.4 µm.

The Na-containing niobium titanium composite oxide having an orthorhombic crystal structure may have a composition and a crystal structure similar to those of the composite oxide described in the first embodiment, for example.

[Production Method]

The active material according to the fourth embodiment can be obtained by the following method, for example.

The active material according to the fourth embodiment can be produced by a solid-phase method to be hereinafter described by referring to examples. However, the active material according to the fourth embodiment can be produced by a wet method, such as a hydrothermal method, a sol-gel method, and a coprecipitation method, in place of the solid-phase method. In wet synthesis, fine particles are easily obtained.

Hereinafter, an example of a method of synthesizing the active material according to the fourth embodiment with the use of the solid-phase method will be described.

First, among a Ti source, a Li source, a Na source, a Nb source, a metal element M1 source, and a metal element M2 source, the necessary raw material is provided in accordance with the target composition of the orthorhombic Na-containing niobium titanium composite oxide to be included in the active material. Those raw materials may be compound such as an oxide or salts, for example. The above salt is preferably a salt decomposed at relatively low temperature to produce an oxide, like carbonate and nitrate.

Next, the provided raw materials are mixed at an appropriate stoichiometric ratio, thus obtaining a mixture. For example, when a Na-containing niobium titanium composite oxide having an orthorhombic crystal structure and represented by a composition formula of $Li_2Na_{1.7}Ti_{5.7}Nb_{0.3}O_{14}$ is to be synthesized, $TiO_2$, $Li_2CO_3$, $Na_2CO_3$ and $Nb(OH)_5$ are mixed such that a molar ratio Li:Na:Ti:Nb in the mixture is 2:1.7:5.7:0.3 in terms of molar ratio.

In the mixing, it is preferable that the raw material is satisfactorily ground and mixed. When the raw material is ground and mixed, the raw materials easily react with each other in the subsequent heat treatment, and generation of impurities can be reduced at the synthesis of a composite oxide. Li and Na may be mixed in an amount larger than a predetermined amount. In particular, since Li may be lost during heat treatment, Li may be added in an amount larger than the predetermined amount.

Next, the mixture of the raw materials is heat treated at a temperature of from 900° C. to 1100° C. for 3 hours to 24 hours in the air atmosphere. Satisfactory crystallization is less likely to be obtained at a temperature lower than 900° C. On the other hand, when the temperature exceeds 1100° C., grain growth is excessively advanced, so that coarse particles are obtained, and thus it is not preferable. When the orthorhombic Na-containing niobium titanium composite oxide represented by a composition formula of $Li_2Na_{1.7}Ti_{5.7}Nb_{0.3}O_{14}$ is to be synthesized, heat treatment is performed at 1000° C. for 3 hours, for example. Thus, the active material according to the fourth embodiment can be obtained.

The active material according to the fourth embodiment may be subjected to ball mill treatment to be pulverized. In the pulverization according to the ball mill treatment, the particle size is preferably not more than 1 µm. It is preferable that heat treatment is performed after the ball mill treatment. The heat treatment temperature is preferably from 600° C. to 800° C. It is preferable that the heat treatment is performed in the air atmosphere. The crystallinity on a particle surface is sometimes disturbed due to the ball mill treatment. The aim of this heat treatment is to improve (re-enhance) the crystallinity on the particle surface. If the temperature is less than 600° C., the crystallinity on the particle surface is less likely to be enhanced, and if the temperature is more than 800° C., grain growth is a concern. The heat treatment time is preferably 1 to 3 hours.

Next, a method of calculating the average crystalline size of an active material and a method of measuring the average primary particle size will be described.

<Method of Calculating Average Crystalline Size of Active Material>

For the average crystalline size of an active material, the half-value width of a peak is obtained based on the X-ray diffraction pattern of active material particles described in the first embodiment, obtained by the wide-angle X-ray diffraction method, and a crystalline diameter (crystalline size) D can be calculated by using the Scherrer equation shown below.

A value obtained by subjecting the spectrum to fitting is used as the half-value width of the peak. The spectrum is subjected to fitting as follows. First, subtraction of background, separation of a Kα1 peak and a Kα2 peak, and pretreatment according to smoothing are carried out. Next, the spectrum after the pretreatment is subjected to peak search according to secondary differentiation. Next, a background profile is obtained by deducting a peak profile formed from the peak selected by the peak search from the spectrum after the pretreatment. The background profile thus obtained is subjected to fitting according to a polynomial equation. By virtue of the use of the peak profile formed from the peak selected by the peak search and information on the background, the spectrum after the pretreatment is subjected to the profile fitting according to a least-squares method, whereby each variable of the peak information and the information on the background is optimized. A division type pseudo Voigt function is used as a fitting function for the peak. In this method, automatic profile treatment is performed using, for example, analysis software "Rigaku PDXL2 ver.2.1", whereby a series of operations can be automatically performed. The half-value width of each peak can be obtained by the above method.

$$D = K\lambda/\beta \cos \theta \qquad \text{[Formula 1]}$$

Herein, K: Scherrer constant; λ: wavelength of Cu-Kα ray (=0.15406 nm); and β: half-value width of diffraction peak.

The diffraction peak used for calculation is taken to be a strongest peak in a range where 2θ is 44.5° to 45.5° corresponding to a (024) plane of the crystal structure of the Na-containing niobium titanium composite oxide having the orthorhombic crystal structure. The Scherrer constant is set to K=0.9.

<Method of Measuring Average Primary Particle Size of Active Material>

First, an active material to be measured is observed with a scanning electron microscope (SEM) according to the procedure similar to that described in the first embodiment. In the sampling, a sampling is performed under an inert atmosphere, such as argon and nitrogen, while being prevented from being exposed to air.

The average primary particle size is obtained from a diameter of a smallest circle corresponding to a primary particle. Specifically, particle size measurement is performed ten times in a SEM image magnified 3000 times, and an average of diameters of smallest circles obtained in the respective measurements is taken to be the average primary particle size. In the calculation of the average, among the ten measurements, the maximum value and the minimum value of the particle size are not used.

The active material according to the fourth embodiment can be used in a nonaqueous electrolyte battery as in the active material according to the first embodiment, for example. For example, the active material according to the fourth embodiment can be used in a nonaqueous electrolyte battery in the same manner as the second embodiment, except that the active material is used instead of or together with the active material according to the first embodiment. A nonaqueous electrolyte battery including the active material according to the fourth embodiment can exhibit excellent cycle life characteristics and excellent rate characteristics.

The nonaqueous electrolyte battery including the active material according to the fourth embodiment can be used in a battery pack as in the nonaqueous electrolyte battery according to the second embodiment, for example. For example, the nonaqueous electrolyte battery including the active material according to the fourth embodiment can be used in a battery pack in the same manner as the third embodiment, except that the nonaqueous electrolyte battery is used instead of or together with the nonaqueous electrolyte battery according to the second embodiment. A battery pack including the active material according to the fourth embodiment can exhibit excellent cycle life characteristics and excellent rate characteristics. Further, the battery pack including the active material according to the fourth embodiment can be mounted in a vehicle as with the battery pack according to the third embodiment.

Namely, the active material according to the fourth embodiment can achieve a nonaqueous electrolyte battery which can exhibit excellent cycle life characteristics and excellent rate characteristics.

EXAMPLES

Examples will be explained below, but the present invention is not limited to the Examples described below without departing from the scope of the invention.

Example 1

In Example 1, an active material of Example 1 was obtained by the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to a first heat treatment at 900° C. for 3 hours in the air atmosphere. Thus, a powder of a product was obtained.

Next, the obtained product powder was subjected to a second heat treatment at 600° C. for 3 hours in an oxygen atmosphere. Thus, the active material of Example 1 was obtained.

A portion of the active material of Example 1 was subjected to ICP analysis, XRD measurement, and SEM observation, which are described above. As a result, it was found that the active material of Example 1 included particles of the orthorhombic composite oxide having a composition of $Li_2Na_{1.7}Ti_{5.7}Nb_{0.3}O_{14}$.

Example 2

In Example 2, an active material of Example 2 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1.9:5.9:0.1.

A portion of the active material of Example 2 was subjected to powder X-ray diffraction measurement, ICP analysis and SEM observation, which are described above. As a result, it was found that the active material of Example 2 included particles of an orthorhombic composite oxide 2 having a composition of $Li_2Na_{1.9}Ti_{5.9}Nb_{0.1}O_{14}$.

Example 3

In Example 3, an active material of Example 3 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2.1:1.8:5.9:0.1.

A portion of the active material of Example 3 was subjected to ICP analysis, XRD measurement, and SEM observation, which are described above. As a result, it was found that the active material of Example 3 included particles of an orthorhombic composite oxide having a composition of $Li_{2.1}Na_{1.8}Ti_{5.9}Nb_{0.1}O_{14}$.

Example 4

In Example 4, an active material of Example 4 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1.5:5.5:0.5.

A portion of the active material of Example 4 was subjected to ICP analysis, XRD measurement, and SEM observation, which are described above. As a result, it was found that the active material of Example 4 included particles of an orthorhombic composite oxide having a composition of $Li_2Na_{1.5}Ti_{5.5}Nb_{0.5}O_{14}$.

The diffraction pattern (1) in FIG. 1 is an X-ray diffraction pattern of the active material of Example 4.

Example 5

In Example 5, an active material of Example 5 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2.1:1.4:5.5:0.5.

A portion of the active material of Example 5 was subjected to ICP analysis, XRD measurement, and SEM observation, which are described above. As a result, it was found that the active material of Example 5 included particles of an orthorhombic composite oxide having a composition of $Li_{2.1}Na_{1.4}Ti_{5.5}Nb_{0.5}O_{14}$.

Example 6

In Example 6, an active material of Example 6 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2.2:1.4:5.5:0.5.

A portion of the active material of Example 6 was subjected to ICP analysis, XRD measurement, and SEM observation, which are described above. As a result, it was found that the active material of Example 6 included particles of an orthorhombic composite oxide having a composition of $Li_{2.2}Na_{1.4}Ti_{5.5}Nb_{0.5}O_{14}$.

Example 7

In Example 7, an active material of Example 7 was obtained according to the procedure similar to that in Example 1 except that when raw materials were mixed, a powder of titanium dioxide $TiO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb in a mixture was 2:1:5:1.

A portion of the active material of Example 7 was subjected to ICP analysis, XRD measurement, and SEM observation, which are described above. As a result, it was found that the active material of Example 7 included particles of an orthorhombic composite oxide having a composition of $Li_2NaTi_5NbO_{14}$.

Example 8

In Example 8, an active material of Example 8 was obtained according to the procedure similar to that in Example 1 except that a powder of strontium nitrate $Sr(NO_3)_2$ was further used as a raw material, and when raw materials were mixed, a powder of titanium dioxide $TiO_2$, the powder of strontium nitrate $Sr(NO_3)_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Sr:Ti:Nb in a mixture was 2:1:0.5:5.9:0.1.

A portion of the active material of Example 8 was subjected to ICP analysis, XRD measurement, and SEM observation, which are described above. As a result, it was found that the active material of Example 8 included particles of an orthorhombic composite oxide having a composition $Li_2NaSr_{0.5}Ti_{5.9}Nb_{0.1}O_{14}$.

Example 9

In Example 9, an active material of Example 9 was obtained according to the procedure similar to that in Example 8 except that when raw materials were mixed, a powder of titanium dioxide $TiO_2$, a powder of strontium nitrate $Sr(NO_3)_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Sr:Ti:Nb in a mixture was 2:1.5:0.2:5.9:0.1.

A portion of the active material of Example 9 was subjected to ICP analysis, XRD measurement, and SEM observation, which are described above. As a result, it was found that the active material of Example 9 included particles of an orthorhombic composite oxide having a composition of $Li_2Na_{1.5}Sr_{0.2}Ti_{5.9}Nb_{0.1}O_{14}$.

Example 10

In Example 10, an active material of Example 10 was obtained according to the procedure similar to that in Example 1 except that a powder of barium carbonate $BaCO_3$ was further used as a raw material, and when raw materials were mixed, a powder of titanium dioxide $TiO_2$, the powder of barium carbonate $BaCO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ba:Ti:Nb in a mixture was 2:1.5:0.2:5.9:0.1.

A portion of the active material of Example 10 was subjected to ICP analysis, XRD measurement, and SEM observation, which are described above. As a result, it was found that the active material of Example 10 included particles of an orthorhombic composite oxide having a composition of $Li_2Na_{1.5}Ba_{0.2}Ti_{5.9}Nb_{0.1}O_{14}$.

Example 11

In Example 11, an active material of Example 11 was obtained according to the procedure similar to that in Example 10 except that when raw materials were mixed, a powder of titanium dioxide $TiO_2$, a powder of barium carbonate $BaCO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ba:Ti:Nb in a mixture was 2:1.5:0.2:5.5:0.5.

A portion of the active material of Example 11 was subjected to ICP analysis, XRD measurement, and SEM observation, which are described above. As a result, it was found that the active material of Example 11 included particles of an orthorhombic composite oxide having a composition of $Li_2Na_{1.5}Ba_{0.2}Ti_{5.5}Nb_{0.5}O_{14}$.

Example 12

In Example 12, an active material of Example 12 was obtained according to the procedure similar to that in Example 1 except that a powder of tin oxide $SnO_2$ was further used as a raw material, and when raw materials were mixed, a powder of titanium dioxide $TiO_2$, the powder of tin oxide $SnO_2$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Sn in a mixture was 2:1.9:5.8:0.1:0.1.

A portion of the active material of Example 12 was subjected to ICP analysis, XRD measurement, and SEM observation, which are described above. As a result, it was found that the active material of Example 12 included particles of an orthorhombic composite oxide having a composition of $Li_2Na_{1.9}Ti_{5.8}Nb_{0.1}Sn_{0.1}O_{14}$.

Example 13

In Example 13, an active material of Example 13 was obtained according to the procedure similar to that in Example 1 except that a powder of tantalum (V) oxide $Ta_2O_5$ was further used as a raw material, and when raw materials were mixed, a powder of titanium dioxide $TiO_2$, the powder of tantalum (V) oxide $Ta_2O_5$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Ta in a mixture was 2.1:1.9:5.8:0.1:0.1.

A portion of the active material of Example 13 was subjected to ICP analysis, XRD measurement, and SEM observation, which are described above. As a result, it was found that the active material of Example 13 included particles of an orthorhombic composite oxide having a composition of $Li_{2.1}Na_{1.9}Ti_{5.8}Nb_{0.1}Ta_{0.1}O_{14}$.

Example 14

In Example 14, an active material of Example 14 was obtained according to the procedure similar to that in Example 1 except that a powder of vanadium (V) oxide $V_2O_5$ was further used as a raw material, and when raw materials were mixed, a powder of titanium dioxide $TiO_2$, the powder of vanadium (V) oxide $V_2O_5$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:V in a mixture was 2.1:1.9:5.8:0.1:0.1.

A portion of the active material of Example 14 was subjected to ICP analysis, XRD measurement, and SEM observation, which are described above. As a result, it was found that the active material of Example 14 included particles of an orthorhombic composite oxide having a composition of $Li_{2.1}Na_{1.9}Ti_{5.8}Nb_{0.1}V_{0.1}O_{14}$.

Example 15

In Example 15, an active material of Example 15 was obtained according to the procedure similar to that in Example 1 except that a powder of iron (III) oxide $Fe_2O_3$ was further used as a raw material, and when raw materials were mixed, a powder of titanium dioxide $TiO_2$, the powder of iron (III) oxide $Fe_2O_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Fe in a mixture was 2:1.9:5.8:0.1:0.1.

A portion of the active material of Example 15 was subjected to ICP analysis, XRD measurement, and SEM observation, which are described above. As a result, it was found that the active material of Example 15 included particles of an orthorhombic composite oxide having a composition of $Li_2Na_{1.9}Ti_{5.8}Nb_{0.1}Fe_{0.1}O_{14}$.

Example 16

In Example 16, an active material of Example 16 was obtained according to the procedure similar to that in Example 1 except that a powder of cobalt oxide $Co_3O_4$ was further used as a raw material, and when raw materials were mixed, a powder of titanium dioxide $TiO_2$, the powder of cobalt oxide $Co_3O_4$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Co in a mixture was 2:1.9:5.8:0.1:0.1.

A portion of the active material of Example 16 was subjected to ICP analysis, XRD measurement, and SEM observation, which are described above. As a result, it was found that the active material of Example 16 contained particles of an orthorhombic composite oxide having a composition of $Li_2Na_{1.9}Ti_{5.8}Nb_{0.1}Co_{0.1}O_{14}$.

Example 17

In Example 17, an active material of Example 17 was obtained according to the procedure similar to that in Example 1 except that a powder of manganese oxide $Mn_3O_4$ was further used as a raw material, and when raw materials were mixed, a powder of titanium dioxide $TiO_2$, the powder of manganese oxide $Mn_3O_4$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:Na:Ti:Nb:Mn in a mixture was 2:1.9:5.8:0.1:0.1.

A portion of the active material of Example 17 was subjected to ICP analysis, XRD measurement, and SEM observation, which are described above. As a result, it was found that the active material of Example 17 included particles of an orthorhombic composite oxide having a composition of $Li_2Na_{1.9}Ti_{5.8}Nb_{0.1}Mn_{0.1}O_{14}$.

Example 18

In Example 18, an active material of Example 18 was obtained according to the procedure similar to that in Example 1 except that a powder of molybdenum oxide $MoO_3$ was further used as a raw material, and when raw materials were mixed, a powder of titanium dioxide $TiO_2$, the powder of molybdenum oxide $MoO_3$, a powder of lithium carbonate $Li_2CO_3$, a powder of sodium carbonate $Na_2CO_3$, and a powder of niobium (V) hydroxide $Nb(OH)_5$ were mixed such that the molar ratio of Li:NaTi:Nb:Mo in a mixture was 2:1.9:5.8:0.1:0.1.

A portion of the active material of Example 18 was subjected to ICP analysis, XRD measurement, and SEM observation described above. As a result, it was found that the active material of Example 18 included particles of an orthorhombic composite oxide having a composition of $Li_2Na_{1.9}Ti_{5.8}Nb_{0.1}Mo_{0.1}O_{14}$.

Comparative Example 1

In Comparative Example 1, an active material of Comparative Example 1 was obtained according to the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to a first heat treatment at 900° C. for 3 hours in the air atmosphere. Thus, the active material of Comparative Example 1 was obtained.

A portion of the active material of Comparative Example 1 was subjected to ICP analysis, XRD measurement, and SEM observation, which are described above. As a result, it was found that the active material of Comparative Example 1 included particles of an orthorhombic composite oxide having a composition of $Li_2Na_{1.7}Ti_{5.7}Nb_{0.3}O_{14}$.

Comparative Example 2

In Comparative Example 2, an active material of Comparative Example 2 was obtained according to the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.5:5.5:0.5. Prior to mixing, the raw materials were satisfactorily ground.

Next, a mixture of the raw materials was subjected to a first heat treatment at 900° C. for 3 hours in the air atmosphere. Thus, the active material of Comparative Example 2 was obtained.

A portion of the active material of Comparative Example 2 was subjected to ICP analysis, XRD measurement, and SEM observation, which are described above. As a result, it was found that the active material of Comparative Example 2 contained particles of orthorhombic composite oxide having a composition $Li_2Na_{1.5}Ti_{5.5}Nb_{0.5}O_{14}$.

The diffraction pattern (2) in FIG. 1 is an X-ray diffraction pattern of the active material of Comparative Example 2.

Comparative Example 3

In Comparative Example 3, an active material of Comparative Example 3 was obtained according to the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1:5:1. Prior to mixing, the raw materials were satisfactorily ground.

Next, a mixture of the raw materials was subjected to a first heat treatment at 900° C. for 3 hours in the air atmosphere. Thus, the active material of Comparative Example 3 was obtained.

A portion of the active material of Comparative Example 3 was subjected to ICP analysis, XRD measurement, and SEM observation, which are described above. As a result, it was found that the active material of Comparative Example 3 included particles of an orthorhombic composite oxide having a composition of $Li_2NaTi_5NbO_{14}$.

Comparative Example 4

In Comparative Example 4, an active material of Comparative Example 4 was obtained according to the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.9:5.9:0.1. Prior to mixing, the raw materials were satisfactorily ground.

Next, a mixture of the raw materials was subjected to a first heat treatment at 900° C. for 3 hours in the air atmosphere. Thus, the active material of Comparative Example 4 was obtained.

A portion of the active material of Comparative Example 4 was subjected to ICP analysis, XRD measurement, and SEM observation, which are described above. As a result, it was found that the active material of Comparative Example 4 included particles of an orthorhombic composite oxide having a composition of $Li_2Na_{1.9}Ti_{5.9}Nb_{0.1}O_{14}$.

[Production of Electrode]

Electrodes of Examples 1 to 18 and Comparative Examples 1 to 4 were produced by the following procedure, using the active materials of Examples 1 to 18 and Comparative Examples 1 to 4. In the following description, as a representative example, a procedure for producing the electrode of Example 1 will be described. The electrodes of Examples 2 to 18 and Comparative Examples 1 to 4 were produced by the procedure similar to that in the electrode of Example 1.

First, a powder of the active material of Example 1, acetylene black as a conductive agent, and polyvinylidene fluoride (PVdF) as a binder were provided. They were put into N-methylpyrrolidone (NMP) as a solvent and mixed such that a weight ratio of the active material:acetylene black:PVdF was 90% by weight:5% by weight:5% by weight, thus obtaining a mixture.

Next, the obtained mixture was stirred using a rotation-and-revolution mixer to prepare a slurry. The slurry was applied onto both surfaces of a current collector formed of an aluminum foil having a thickness of 15 μm, and the coated film was dried. Next, the dried coated film was pressed. Thus, the electrode of Example 1 having an electrode density (including no current collector) of 2.3 g/cm³ was produced.

[Production of Cell for Electrode Evaluation]

Next, a cell for electrode evaluation of each of Examples 1 to 18 and Comparative Examples 1 to 4 was produced using each of the electrodes of Examples 1 to 18 and Comparative Examples 1 to 4. In the following description, as a representative example, a procedure for producing the cell for electrode evaluation of Example 1 will be described. The cells for electrode evaluation of Examples 2 to 18 and Comparative Examples 1 to 4 were produced by the procedure similar to that in the cell for electrode evaluation of Example 1.

The cell for electrode evaluation of Example 1 was produced in dry argon according to the following procedure. The electrode of Example 1 was used as a working electrode, and Li metal was used as a counter electrode. Those electrodes were arranged to face each other via a glass filter (separator), and a reference electrode formed of lithium metal was inserted so as not to be in contact with the working electrode and the counter electrode. The above members were placed in a three-pole glass cell, and each of the working electrode, the counter electrode, and the reference electrode was connected to a corresponding terminal of the glass cell.

Next, an electrolytic solution was poured into the glass cell to achieve a state in which the separator and the electrodes were satisfactorily impregnated with the electrolytic solution. The glass cell was sealed in that state. As the electrolytic solution, a liquid electrolyte prepared by dissolving $LiPF_6$ at a concentration of 1.0 mol/L in a mixed solvent was used. As a solvent of the electrolytic solution, a mixed solvent prepared by mixing ethylene carbonate (EC) with diethyl carbonate (DEC) at a volume ratio of 1:2 was used.

<Charge-and-Discharge Test for Cell for Electrode Evaluation>

Each cell for electrode evaluation was subjected to a charge-and-discharge test according to the following procedure. The test environment was a 25° C. environment. A current value 1 C was 120 mA/g (a current value per weight of an active material).

First, each cell for electrode evaluation was subjected to a constant-current charging at the current value 1 C until the potential of a working electrode reached 1.1 V (vs. Li/Li$^+$). Subsequently, each cell for electrode evaluation was subjected to a constant-voltage charging until the current value reached 0.05 C. Namely, charging was performed in a constant-current and constant-voltage mode.

Next, each cell for electrode evaluation was discharged. Discharging herein was performed in a constant-current mode at a constant current of 0.2 C, and a discharge terminal potential was 2.0 V (vs. Li/Li$^+$).

A discharge capacity in the charging-and-discharging test for each cell for electrode evaluation was shown in Table 1 below as a 0.2 C discharge capacity. Table 1 below also shows the intensity ratio $I_1/I_2$ of the peak intensity $I_1$ of the peak $P_1$ and the peak intensitiy of the peak $P_2$. The peak $P_1$ is present within the range where 2θ is 27° to 28°, and the peak $P_2$ is present within the range where 2θ is 23° to 24° in the X-ray diffraction pattern of each active material.

TABLE 1

|  | Peak Intensity Ratio $I_1/I_2$ | Discharge Capacity at 0.2 C (mAh/g) |
|---|---|---|
| Example 1 | 0.13 | 125 |
| Example 2 | 0.13 | 124 |
| Example 3 | 0.12 | 125 |
| Example 4 | 0.15 | 128 |
| Example 5 | 0.16 | 129 |
| Example 6 | 0.16 | 128 |
| Example 7 | 0.16 | 123 |
| Example 8 | 0.22 | 124 |
| Example 9 | 0.19 | 123 |
| Example 10 | 0.16 | 123 |
| Example 11 | 0.17 | 127 |
| Example 12 | 0.16 | 123 |
| Example 13 | 0.17 | 125 |
| Example 14 | 0.18 | 124 |
| Example 15 | 0.16 | 124 |
| Example 16 | 0.16 | 126 |
| Example 17 | 0.17 | 123 |
| Example 18 | 0.14 | 127 |
| Comparative Example 1 | 0.11 | 120 |
| Comparative Example 2 | 0.1 | 123 |
| Comparative Example 3 | 0.1 | 118 |
| Comparative Example 4 | 0.09 | 117 |

The results shown in Table 1 show that the active materials of Examples 1 to 18 can achieve a high discharge capacity as compared with the active materials of Comparative Examples 1 to 4.

In Examples 1 to 18, as described above, a product obtained by the first heat treatment was subjected to the second heat treatment in an oxygen atmosphere. Consequently, in Examples 1 to 18, as shown in Table 1, the peak intensity ratio $I_1/I_2$ was within a range of $0.12 \leq I_1/I_2 \leq 0.25$, whereby an active material which could achieve a high discharge capacity could be obtained.

On the other hand, in Comparative Examples 1 to 4, as shown in Table 1, the peak intensity ratio $I_1/I_2$ was less than 0.12. For example, comparing the discharge capacity between one of Examples and one of Comparative Examples having a similar composition, specifically between Example 1 and Comparative Example 1, between Example 4 and Comparative Example 2, between Example 7 and Comparative Example 3, and between Example 2 and Comparative Example 4, it is found that the active material of the Example in which the peak intensity ratio $I_1/I_2$ is within the range of $0.12 \leq I_1/I_2 \leq 0.25$ could achieve a discharge capacity higher by 5 mAh/g to 7 mAh/g than that in the active material of the corresponding Comparative Example.

Example 19

In Example 19, an active material of Example 19 was obtained according to the following procedure.

First, as raw materials, a powder of titanium oxide $TiO_2$, a powder of lithium carbonate $Li_2CO_3$, a powder of sodium carbonate $Na_2CO_3$, and a powder of niobium (V) hydroxide $Nb(OH)_5$ were provided. Those raw materials were mixed such that the molar ratio of Li:Na:Ti:Nb in a mixture was 2:1.5:5.5:0.5. Prior to mixing, the raw materials were satisfactorily ground.

Next, a mixture of the raw materials was subjected to a first heat treatment at 900° C. for 3 hours in the air atmosphere. Thus, a powder of a product was obtained.

A portion of the obtained product powder was subjected to ICP analysis, XRD measurement, and SEM observation, which are described above. As a result, it was found that the powder of the product included the particles of orthorhombic composite oxide having a composition $Li_2Na_{1.5}Ti_{5.5}Nb_{0.5}O_{14}$.

Next, the powder of the product was mixed with aluminum nitrate nonahydrate $Al(NO_3)_3 \cdot 9H_2O$ in purified water. Next, the mixture was dried to remove moisture from the mixture. Next, the mixture was subjected to the second heat treatment at 600° C. for 3 hours under an oxygen atmosphere. Thus, the active material of Example 19 was obtained.

A portion of the active material of Example 19 was subjected to ICP analysis, XRD measurement, and SEM observation, which are described above. The results of the ICP analysis showed that the active material of Example 19 contained Al in an amount of 0.1% by weight based on the composition of $Li_2Na_{1.5}Ti_{5.5}Nb_{0.5}O_{14}$. The XRD measurement showed that the active material of Example 19 included particles of an orthorhombic Na-containing niobium titanium composite oxide. Here, in the XRD pattern of the active material of Example 19, the peak position was the same as that of the XRD pattern of the particles of the orthorhombic composite oxide having the composition of $Li_2Na_{1.5}Ti_{5.5}Nb_{0.5}O_{14}$ after the first heat treatment. This result showed that in the active material of Example 19, Al was not solid-soluted into the particles, but was present on a surface of the particles. It is considered that Al was present as an oxide.

Example 20

In Example 20, an active material of Example 20 was obtained according to the procedure similar to that in Example 19 except that a powder of the product obtained by the first heat treatment was mixed with not aluminum nitrate nonahydrate but zirconium nitrate dehydrate $ZrO(NO_3)_2 \cdot 2H_2O$ in purified water.

A portion of the active material of Example 20 was subjected to ICP analysis, XRD measurement, and SEM observation, which are described above. The results of the ICP analysis showed that the active material of Example 20 contained Zr in an amount of 0.1% by weight based on the composition of $Li_2Na_{1.5}Ti_{5.5}Nb_{0.5}O_{14}$. The XRD measurement showed that the active material of Example 20 included particles of an orthorhombic Na-containing niobium titanium composite oxide. Here, in the XRD pattern of the active material of Example 20, the peak position was the same as that of the XRD pattern of the particles of the orthorhombic composite oxide having the composition of $Li_2Na_{1.5}Ti_{5.5}Nb_{0.5}O_{14}$ after the first heat treatment. This result showed that in the active material of Example 20, Zr was not solid-soluted into the particles, but was present on a surface of the particles. It is considered that Zr was present as an oxide.

Example 21

In Example 21, an active material of Example 21 was obtained according to the procedure similar to that in Example 19 except that a powder of a product obtained by the first heat treatment was mixed with not aluminum nitrate nonahydrate but magnesium nitrate hexahydrate $Mg(NO_3)_2 \cdot 6H_2O$ in purified water.

A portion of the active material of Example 21 was subjected to ICP analysis, XRD measurement, and SEM observation, which are described above. The results of the ICP analysis showed that the active material of Example 21 contained Mg in an amount of 0.1% by weight based on the composition of $Li_2Na_{1.5}Ti_{5.5}Nb_{0.5}O_{14}$. The XRD measurement showed that the active material of Example 21 included particles of an orthorhombic Na-containing niobium titanium composite oxide. Here, in the XRD pattern of the active material of Example 21, the peak position was the same as that of the XRD pattern of the particles of the orthorhombic composite oxide having the composition of $Li_2Na_{1.5}Ti_{5.5}Nb_{0.5}O_{14}$ after the first heat treatment. This result showed that in the active material of Example 21, Mg was not solid-soluted into the particles but was present on a surface of the particles. It is considered that Zr was present as an oxide.

Example 22

In Example 22, an active material of Example 22 was obtained by the procedure similar to that in Example 19 except that a powder of a product obtained according to the first heat treatment was mixed with not aluminum nitrate nonahydrate but bismuth nitrate pentahydrate $Bi(NO_3)_3 \cdot 5H_2O$ in purified water.

A portion of the active material of Example 22 was subjected to ICP analysis, XRD measurement, and SEM observation, which are described above. The results of the ICP analysis showed that the active material of Example 22 contained Bi in an amount of 0.1% by weight based on the composition of $Li_2Na_{1.5}Ti_{5.5}Nb_{0.5}O_{14}$. The XRD measurement showed that the active material of Example 22 included particles of an orthorhombic Na-containing niobium titanium composite oxide. Here, in the XRD pattern of the active material of Example 22, the peak position was the same as that of the XRD pattern of the particles of the orthorhombic composite oxide having the composition $Li_2Na_{1.5}Ti_{5.5}Nb_{0.5}O_{14}$ after the first heat treatment. This result showed that in the active material of Example 22, Bi was not solid-soluted into the particle but was present on a surface of the particles. It is considered that Bi was present as an oxide.

Example 23

In Example 23, an active material of Example 23 was obtained according to the procedure similar to that in Example 19 except that the second heat treatment was performed at 700° C. for 3 hours under an oxygen atmosphere.

A portion of the active material of Example 23 was subjected to ICP analysis, XRD measurement, and SEM observation, which are described above. The results of the ICP analysis showed that the active material of Example 23 contained Al in an amount of 0.1% by weight based on the composition $Li_2Na_{1.5}Ti_{5.5}Nb_{0.5}O_{14}$. The XRD measurement showed that the active material of Example 23 included particles of an orthorhombic Na-containing niobium titanium composite oxide. Here, in the XRD pattern of the active material of Example 23, the peak position was the same as that of the XRD pattern of the particles of orthorhombic composite oxide having the composition of $Li_2Na_{1.5}Ti_{5.5}Nb_{0.5}O_{14}$ after the first heat treatment. This result showed that in the active material of Example 23, Al was not solid-soluted into the particles but was present on a surface of the particles. It is considered that Al was present as an oxide.

Example 24

In Example 24, an active material of Example 24 was obtained according to the procedure similar to that in Example 19 except that the second heat treatment was performed at 800° C. for 3 hours under an oxygen atmosphere.

A portion of the active material of Example 24 was subjected to ICP analysis, XRD measurement, and SEM observation, which are described above. The results of the ICP analysis showed that the active material of Example 24 contained Al in an amount of 0.1% by weight based on the composition of $Li_2Na_{1.5}Ti_{5.5}Nb_{0.5}O_{14}$. The XRD measurement showed that the active material of Example 24 included particles of an orthorhombic Na-containing niobium titanium composite oxide. Here, in the XRD pattern of the active material of Example 24, the peak position was the same as that of the XRD pattern of the particles of the orthorhombic composite oxide having the composition of $Li_2Na_{1.5}Ti_{5.5}Nb_{0.5}O_{14}$ after the first heat treatment. This result showed that in the active material of Example 24, Al was not solid-soluted into the particles but was present on a surface of the particles. It is considered that Al was present as an oxide.

Example 25

In Example 25, an active material of Example 25 was obtained according to the procedure similar to that in Example 19 except that the second heat treatment was performed at 800° C. for 20 hours under an oxygen atmosphere.

A portion of the active material of Example 25 was subjected to ICP analysis, XRD measurement, and SEM observation, which are described above. The results of the ICP analysis showed that the active material of Example 25 contained Al in an amount of 0.1% by weight based on the composition of $Li_2Na_{1.5}Ti_{5.5}Nb_{0.5}O_{14}$. The XRD measurement showed that the active material of Example 25 included particles of an orthorhombic Na-containing niobium titanium composite oxide. Here, in the XRD pattern of the active material of Example 25, the peak position was the same as that of the XRD pattern of the particles of the orthorhombic composite oxide having the composition of $Li_2Na_{1.5}Ti_{5.5}Nb_{0.5}O_{14}$ after the first heat treatment. This result showed that in the active material of Example 25, Al was not solid-soluted into the particles but was present on a surface of the particles. It is considered that Al was present as an oxide.

Comparative Example 5

In Comparative Example 5, an active material of Comparative Example 5 was obtained according to the procedure similar to that in Example 19 except that the second heat treatment was performed at 900° C. for 20 hours under an oxygen atmosphere.

A portion of the active material of Comparative Example 5 was subjected to ICP analysis, XRD measurement, and SEM observation, which are described above. The results of the ICP analysis showed that the active material of Comparative Example 5 contained Al in an amount of 0.1% by weight based on the composition of $Li_2Na_{1.5}Ti_{5.5}Nb_{0.5}O_{14}$. The XRD measurement showed that the active material of Comparative Example 5 included particles of an orthorhombic Na-containing niobium titanium composite oxide. Here, in the XRD pattern of the active material of Comparative Example 5, as compared with the XRD pattern of the particles of the orthorhombic composite oxide having the composition of $Li_2Na_{1.5}Ti_{5.5}Nb_{0.5}O_{14}$ after the first heat treatment, the peak position of the peak $P_1$ shifted to a low-angle side by approximately 0.05°, so that the peak intensity $I_1$ of the peak $P_1$ became high. Since the peak intensity $I_1$ of the peak $P_1$ became high, it is considered that a certain crystal phase was excessively produced. Further, it is considered that the peak $P_1$ shifted to the low-angle side accordingly. There is a possibility that Al was solid-soluted from the surface of the particles to the inside.

[Test]

Cell for electrode evaluation of each of Examples 19 to 25 and Comparative Example 5 were produced according to the procedure similar to that in Example 1 except that each of the active materials of Examples 19 to 25 and Comparative Example 5 were used. The produced cells for electrode evaluation of Examples 19 to 25 and Comparative Example 5 were subjected to the charge-and-discharge test as in Example 1. Those results are shown in Table 2 below. Table 2 below also shows the intensity ratio $I_1/I_2$ of the peak intensity $I_1$ of the peak $P_1$ that is present within the range where 2θ is 27° to 28° in the X-ray diffraction pattern of each active material and the peak intensity $I_2$ of the peak $P_2$ that is present within the range where 2θ is 23° to 24° in the X-ray diffraction pattern of each active material.

TABLE 2

| | Peak Intensity Ratio $I_1/I_2$ | Additive Element | Discharge Capacity at 0.2 C (mAh/g) |
|---|---|---|---|
| Example 19 | 0.2 | Al | 127 |
| Example 20 | 0.18 | Zr | 127 |
| Example 21 | 0.16 | Mg | 128 |
| Example 22 | 0.22 | Bi | 129 |
| Example 23 | 0.21 | Al | 127 |
| Example 24 | 0.23 | Al | 126 |
| Example 25 | 0.25 | Al | 126 |
| Comparative Example 5 | 0.27 | Al | 111 |

The results shown in Tables 1 and 2 show that as in the active materials of Examples 1 to 18, the active materials of Examples 19 to 25 can achieve a high discharge capacity as compared with the active materials of Comparative Examples 1 to 4 and Comparative Example 5.

As described above, in Examples 19 to 25, the product obtained by the first heat treatment was mixed with a compound containing at least one selected from the group consisting of Mg, Al, Zr, and Bi, and the obtained mixture was subjected to the second heat treatment in an oxygen atmosphere. Consequently, in Examples 19 to 25, as shown in Table 2, the peak intensity ratio $I_1/I_2$ was within a range of $0.12 \leq I_1/I_2 \leq 0.25$, whereby an active material which could achieve a high discharge capacity could be obtained.

On the other hand, in Comparative Example 5, the second heat treatment was performed at 900° C. for 20 hours. The active material thus obtained of Comparative Example 5 had a peak intensity ratio $I_1/I_2$ of 0.27 which was high, as shown in Table 2. The discharge capacity that could be achieved by the active material of Comparative Example 5 was lower than that of each of the active materials of Examples 19 to 25, as shown in Table 2. It is assumed that this is because a phase formed on a particle surface considered to be attributed to a peak appearing within the range where 2θ is 23° to 24° in the X-ray diffraction pattern is excessively formed, leading to reduction in capacity.

As described above, the active materials of Examples 1 to 25 can achieve a high discharge capacity. Accordingly, by virtue of the use of a negative electrode produced using those active materials, a nonaqueous electrolyte battery which can exhibit high capacity can be produced.

A nonaqueous electrolyte battery produced by combining each of the electrodes of Examples 1 to 25 and a positive electrode produced by using lithium cobalt composite oxide can exhibit excellent rate characteristics. A nonaqueous electrolyte battery produced by combining each of the electrodes of Examples 1 to 25 and a positive electrode produced by using lithium nickel cobalt manganese composite oxide can exhibit higher energy density and more excellent cycle life characteristics. A nonaqueous electrolyte battery produced by combining the electrodes of Examples 1 to 25 and a positive electrode produced by using spinel-type lithium manganese composite oxide can exhibit more excellent cycle life characteristics and more excellent rate characteristics. A nonaqueous electrolyte battery produced by combining the electrodes of Examples 1 to 25 and a positive electrode produced using an olivine-type lithium manganese iron composite phosphate can exhibit excellent cycle life characteristics, particularly at high temperature.

Example 31

In Example 31, an active material of Example 31 was obtained according to the following procedure.

First, as raw materials, a powder of titanium oxide $TiO_2$, a powder of lithium hydroxide LiOH, a powder of sodium hydroxide NaOH, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to a first heat treatment at 1000° C. for 10 hours in the air atmosphere. Thus, a powder of a product was obtained.

Next, the obtained product powder was pulverized by ball mill grinding. In such case, zirconia balls having a median diameter of 0.1 mm were put into a pot in an amount of 30% based on the pot volume. The charged amount of the product powder was 30% based on the pot capacity. In addition, ethanol was added such that a space was formed in 30% of the pot volume. The ball mill grinding was performed ten times. Each grinding was performed at room temperature and 500 rpm for 1 hour.

After the ball mill grinding, a treated material was isolated by filtration. The residue was freeze-dried, thus obtaining a powder. The obtained powder was subjected to a second heat treatment at 800° C. for 1 hour. Thus, the active material of Example 31 was obtained.

The active material of Example 31 was subjected to ICP analysis, XRD measurement, and SEM observation, which are described above. As a result, it was found that the active material of Example 31 included particles of an orthorhombic composite oxide having a composition of $Li_2Na_{1.7}Ti_{5.7}Nb_{0.3}O_{14}$.

An average crystalline size of the active material of Example 31 was calculated according to the above-described procedure, based on the XRD pattern of the active material of Example 31. As a result, the average crystalline size of the active material of Example 31 was 110 nm. An average primary particle size obtained by SEM measurement for the active material of Example 31 was 0.8 μm.

Example 32

In Example 32, an active material of Example 32 was obtained according to the following procedure.

First, as raw materials, a powder of titanium oxide $TiO_2$, a powder of lithium hydroxide LiOH, a powder of sodium hydroxide NaOH, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to a first heat treatment at 1000° C. for 10 hours in the air atmosphere. Thus, a powder of a product was obtained.

Next, the obtained product powder was pulverized by ball mill grinding. In such case, zirconia balls having a median diameter of 0.1 mm were put into a pot in an amount of 30% based on the pot volume. The charged amount of the product powder was 30% based on the pot capacity. In addition, ethanol was added such that a space was formed in 30% of the pot volume. The ball mill grinding was performed ten times. Each grinding was performed at room temperature and 500 rpm for 1 hour.

After the ball mill grinding, a treated material was isolated by filtration. The residue was freeze-dried, thus obtaining a powder. The obtained powder was subjected to a second heat treatment at 900° C. for 4 hours. Thus, the active material of Example 32 was obtained.

The active material of Example 32 was subjected to ICP analysis, XRD measurement, and SEM observation, which are described above. As a result, it was found that the active material of Example 32 included particles of an orthorhombic composite oxide having a composition of $Li_2Na_{1.7}Ti_{5.7}Nb_{0.3}O_{14}$.

An average crystalline size of the active material of Example 32 was calculated according to the above-described procedure, based on the XRD pattern of the active material of Example 32. As a result, the average crystalline size of the active material of Example 32 was 140 nm. An average primary particle size obtained by SEM measurement for the active material of Example 32 was 1.9 μm.

Example 33

In Example 33, an active material of Example 33 was obtained by the following procedure.

First, as raw materials, a powder of titanium oxide $TiO_2$, a powder of lithium hydroxide LiOH, a powder of sodium hydroxide NaOH, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to heat treatment at 1000° C. for 3 hours in the air atmosphere. Thus, a powder of a product was obtained. The product powder was employed as the active material of Example 33.

The active material of Example 33 was subjected to ICP analysis, XRD measurement, and SEM observation, which are described above. As a result, it was found that the active material of Example 33 included particles of an orthorhombic composite oxide having a composition of $Li_2Na_{1.7}Ti_{5.7}Nb_{0.3}O_{14}$.

An average crystalline size of the active material of Example 33 was calculated by the above-described procedure, based on the XRD pattern of the active material of Example 33. As a result, the average crystalline size of the active material of Example 33 was 120 nm. An average primary particle size obtained by SEM measurement for the active material of Example 33 was 2.8 μm.

Comparative Example 31

In Comparative Example 31, an active material of Comparative Example 31 was obtained according to the following procedure.

First, as raw materials, a powder of titanium oxide $TiO_2$, a powder of lithium hydroxide LiOH, a powder of sodium hydroxide NaOH, and a powder of niobium (V) hydroxide $Nb(OH)_5$ were provided. Those raw materials were mixed such that the molar ratio of Li:Na:Ti:Nb in a mixture was 2:1.7:5.7:0.3. Prior to mixing, the raw materials were satisfactorily ground.

Next, a mixture of the raw materials was subjected to heat treatment at 850° C. for 1 hour in the air atmosphere. Thus, a powder of a product was obtained. The product powder was employed as the active material of Comparative Example 31.

The active material of Comparative Example 31 was subjected to ICP analysis, XRD measurement, and SEM observation, which are described above. As a result, it was found that the active material of Comparative Example 31 included particles of anorthorhombic composite oxide having a composition of $Li_2Na_{1.7}Ti_{5.7}Nb_{0.3}O_{14}$.

An average crystalline size of the active material of Comparative Example 31 was calculated by the above-described procedure, based on the XRD pattern of the active material of Comparative Example 31. As a result, the average crystalline size of the active material of Example 33 was 85 nm. A median diameter of the active material of Comparative Example 31 obtained by laser diffraction particle size distribution measurement was 1.2 μm.

[Production of Cell for Electrode Evaluation]

Cell for electrode evaluation of each of Examples 31 to 33 and Comparative Example 31 were produced according to the procedure similar to that in Example 1 except that each of the active materials of Examples 31 to 33 and Comparative Example 31 was used.

<Test of Cell for Electrode Evaluation>

Each cell for electrode evaluation was subjected to a rate test and a cycle test according to the following procedure.

[Rate Test]

The test environment of the rate test was a 25° C. environment. A current value 1 C was 120 mA/g (a current value per weight of an active material).

First, each cell for electrode evaluation was subjected to a constant-current charging at the current value 1 C until the potential of a working electrode reached 1.1 V (vs. Li/Li$^+$). Subsequently, each cell for electrode evaluation was subjected to a constant-voltage charging until the current value reached 0.05 C. Namely, charging was performed in a constant-current and constant-voltage mode.

Next, each cell for electrode evaluation was discharged. Discharging herein was performed in a constant-current mode of 1 C, and a discharge terminal potential was 2.0 V (vs. Li/Li$^+$). The capacity of each cell for electrode evaluation obtained by this discharge was taken to be a discharge capacity at 1 C.

Next, each cell for electrode evaluation was subjected to charging in the constant-current and constant-voltage mode under the same conditions as described above. Next, each cell for electrode evaluation was discharged. Discharging herein was performed in a constant-current mode of 10 C, and a discharge terminal potential was 2.0 V (vs. Li/Li$^+$). The capacity of each cell for electrode evaluation obtained by this discharge was taken to be a discharge capacity at 10 C.

A ratio of the 10 C discharge capacity to the 1 C discharge capacity for each cell for electrode evaluation was calculated. The results are shown in Table 3 below.

[Cycle Characteristics Evaluation]

The test environment of the cycle test was a 45° C. environment. A current value 1 C was 120 mA/g (a current value per weight of an active material).

First, each cell for electrode evaluation was subjected to constant current charging at the current value 1 C until the potential of a working electrode reached 1.1 V (vs. Li/Li$^+$). Subsequently, each cell for electrode evaluation was subjected to a constant-voltage charging until the current value reached 0.05 C. Namely, charging was performed in a constant-current and constant-voltage mode.

Next, suspension for 5 minutes was performed.

Next, each cell for electrode evaluation was discharged. Discharging herein was performed in a constant current mode of 1 C, and a discharge terminal potential was 2.0 V (vs. Li/Li$^+$).

The above set of charge, suspension, and discharge was taken to be one charge-and-discharge cycle. For each cell for electrode evaluation, this charge-and-discharge cycle was repeated 50 times.

A ratio of the discharge capacity at a 50-th cycle to the discharge capacity in a first cycle was calculated as a capacity retention ratio after cycles. The results are shown in Table 3 below.

TABLE 3

|  | Ratio of Discharge Capacity at 10 C to Discharge Capacity at 1 C [%] | Capacity Retention Ratio after Cycles [%] | Average Crystalline Size [nm] | Average Primary Particle Size [μm] |
| --- | --- | --- | --- | --- |
| Example 31 | 95 | 90 | 110 | 0.8 |
| Example 32 | 91 | 93 | 140 | 1.9 |
| Example 33 | 80 | 85 | 120 | 2.8 |
| Comparative Example 31 | 77 | 81 | 85 | 1.2 |

The results shown in Table 3 show that the active materials of Examples 31 to 33 each having an average crystalline size of not less than 100 nm could exhibit excellent rate characteristics and excellent cycle life characteristics as compared with the active material of Comparative Example 31 having an average crystalline size of less than 100 nm.

The results shown in Table 3 further show that the active materials of Examples 31 and 32 each having an average primary particle size of not more than 2 μm could exhibit excellent rate characteristics and excellent cycle life characteristics as compared with the active material of Example 33 having an average primary particle size of more than 2 μm.

According to one or more embodiments and Examples described above, an active material is provided. The active material includes particles including a Na-containing niobium titanium composite oxide having an orthorhombic crystal structure, and in the X-ray diffraction pattern of the active material, the intensity ratio $I_1/I_2$ of the peak intensity $I_1$ of the peak $P_1$ and the peak intensity $I_2$ of the peak $P_2$ is within the range of $0.12 \leq I_1/I_2 \leq 0.25$. Consequently, the active material can achieve a nonaqueous electrolyte battery which can exhibit a high capacity.

According to one or more embodiments and Examples described above, an active material is provided. The active material includes particles of a Na-containing niobium titanium composite oxide having an orthorhombic crystal structure. The active material has an average crystalline size of 100 nm or more. The active material can achieve a nonaqueous electrolyte battery which can exhibit excellent cycle life characteristics and excellent rate characteristics.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An active material comprising particles of a Na-containing niobium titanium composite oxide having an orthorhombic crystal structure, wherein an intensity ratio $I_1/I_2$ is within a range of $0.12 \leq I_1/I_2 \leq 0.25$ in an X-ray diffraction pattern of the active material, according to X-ray diffraction measurement using a Cu-Kα ray, $I_1$ is a peak intensity of a peak $P_1$ that is present within a range where 2θ is 27° to 28° in the X-ray diffraction pattern of the active material, and $I_2$ is a peak intensity of a peak $P_2$ that is present within a range where 2θ is 23° to 24° in the X-ray diffraction pattern of the active material, and wherein the Na-containing niobium titanium composite oxide is represented by the following formula:

$$Li_{2+v}Na_{2-w}M1_xTi_{6-y-z}Nb_yM2_zO_{14+\delta},$$

wherein $0 \leq v \leq 4$, $0.1 \leq w \leq 1$, $0 \leq x < 2$, $0 < y < 6$, $0 \leq z < 3$, and $-0.5 \leq \delta \leq 0.5$, the M1 is at least one metal element selected from the group consisting of Cs, K, Sr, Ba, and Ca, and the M2 is at least one metal element selected from the group consisting of Sn, V, Ta, Mo, W, Fe, Co, and Mn.

2. The active material according to claim 1, wherein the intensity ratio $I_1/I_2$ is within a range of $0.14 \leq I_1/I_2 \leq 0.2$.

3. The active material according to claim 1, wherein the intensity ratio $I_1/I_2$ is within a range of $0.16 \leq I_1/I_2 \leq 0.18$.

4. The active material according to claim 1, a value of y is within a range of $0.1 \leq y \leq 1$.

5. The active material according to claim 1, wherein at least one element selected from the group consisting of Mg, Al, Zr, and Bi is present on a surface of the particles of the Na-containing niobium titanium composite oxide.

6. A nonaqueous electrolyte battery comprising:
a negative electrode comprising the active material according to claim 1;
a positive electrode; and
a nonaqueous electrolyte.

7. The nonaqueous electrolyte battery according to claim 6, wherein the positive electrode comprises at least one selected from the group consisting of a lithium cobalt composite oxide, a lithium nickel cobalt manganese composite oxide, a spinel-type lithium manganese composite oxide, and an olivine-type lithium manganese iron composite phosphate.

8. A battery pack comprising the nonaqueous electrolyte battery according to claim 6.

9. The battery pack according to claim 8, further comprising:
an external power distribution terminal; and
a protective circuit.

10. A battery pack comprising nonaqueous electrolyte batteries each according to claim 6, wherein the nonaqueous electrolyte batteries are electrically connected in series, in parallel, or in combination of series and parallel.

11. A vehicle comprising the battery pack according to claim 8.

12. The vehicle according to claim 11, wherein the battery pack is configured to recover a regenerative energy of a power of the vehicle.

* * * * *